(12) United States Patent
Sydorchuk et al.

(10) Patent No.: US 12,272,384 B1
(45) Date of Patent: Apr. 8, 2025

(54) SYNCHRONIZATION OF LIP MOVEMENT IMAGES TO AUDIO VOICE SIGNAL

(71) Applicant: Pheon, Inc., San Francisco, CA (US)

(72) Inventors: Kyrylo Sydorchuk, Kharkov (UA); Volodymyr Cherniavskyi, Kharkov (UA); Stanislav Mihailevschii, Ribnita (MD); Oleh Vallas, Kharkov (UA); Ivan Shuhaienko, Kharkov (UA); Daniil Krasylnikov, Kharkov (UA); Yurii Astafiev, Kharkov (UA)

(73) Assignee: Pheon, Inc., San Francisco, CA (US)

( * ) Notice: Subject to any disclaimer, the term of this patent is extended or adjusted under 35 U.S.C. 154(b) by 0 days.

(21) Appl. No.: 18/805,819

(22) Filed: Aug. 15, 2024

(51) Int. Cl.
| | |
|---|---|
| *G11B 27/031* | (2006.01) |
| *G06V 10/82* | (2022.01) |
| *G06V 20/40* | (2022.01) |
| *G06V 40/16* | (2022.01) |
| *G10L 15/02* | (2006.01) |
| *G10L 15/04* | (2013.01) |

(Continued)

(52) U.S. Cl.
CPC ............ *G11B 27/031* (2013.01); *G06V 10/82* (2022.01); *G06V 20/46* (2022.01); *G06V 20/49* (2022.01); *G06V 40/169* (2022.01); *G06V 40/175* (2022.01); *G10L 15/02* (2013.01); *G10L 15/04* (2013.01); *G10L 15/16* (2013.01); *G10L 25/57* (2013.01)

(58) Field of Classification Search
CPC ...... G11B 27/031; G06V 10/82; G06V 20/46; G06V 20/49; G06V 40/169; G06V 40/175; G10L 15/02; G10L 15/04; G10L 15/16; G10L 25/57

USPC ......................................................... 386/285
See application file for complete search history.

(56) References Cited

U.S. PATENT DOCUMENTS

| | | | |
|---|---|---|---|
| 7,246,314 B2 * | 7/2007 | Foote ................. | G06F 16/7328 |
| | | | 707/E17.028 |
| 8,780,756 B2 * | 7/2014 | Ogikubo ............ | H04N 1/32112 |
| | | | 370/254 |
| 9,338,467 B1 * | 5/2016 | Gadepalli ............ | H04N 19/184 |

(Continued)

OTHER PUBLICATIONS

Chen et al. "Hierarchical cross-modal talking face generation with dynamic pixel-wise loss", Proceedings of the IEEE Conference on Computer Vision and Pattern Recognition (CVPR) (2019), pp. 7832-7841.

(Continued)

*Primary Examiner* — Helen Shibru
(74) *Attorney, Agent, or Firm* — Georgiy L. Khayet

(57) ABSTRACT

Systems and methods for synchronization of lip movement images to an audio voice signal are provided. A method includes acquiring a source video; dividing the source video into a set of image frames and a set of audio frames; generating, by the computing device, a vector database based on the set of image frames and the set of audio frames, wherein a vector of the vector database includes a face vector and an audio vector; receiving a target image frame and a target audio frame; determining a target image vector based on the target image frame and a target audio vector based on the target audio frame; searching the vector database to select a pre-determined number of vectors corresponding to the target image vector and the target audio frame; and generating, based on the pre-determined number of vectors, an output image frame of an output video.

20 Claims, 20 Drawing Sheets

(51) Int. Cl.
*G10L 15/16* (2006.01)
*G10L 25/57* (2013.01)

(56) References Cited

U.S. PATENT DOCUMENTS

| | | | |
|---|---|---|---|
| 11,756,291 B2* | 9/2023 | Turkelson | G06V 30/19173 |
| 12,153,627 B1* | 11/2024 | Lee | G06F 16/7844 |
| 2005/0232497 A1* | 10/2005 | Yogeshwar | H04N 19/152 |
| | | | 375/E7.14 |
| 2019/0073520 A1* | 3/2019 | Ayyar | G06V 40/173 |
| 2022/0245655 A1* | 8/2022 | Faith | G06V 40/176 |
| 2023/0238002 A1* | 7/2023 | Hirano | G10L 17/02 |
| | | | 704/232 |
| 2023/0291909 A1* | 9/2023 | Liang | H04N 19/46 |
| 2024/0428776 A1* | 12/2024 | Kang | G06F 3/04847 |

OTHER PUBLICATIONS

K R Prajwal et al. "A Lip Sync Expert Is All You Need for Speech to Lip Generation in the Wild", MM '20: Proceedings of the 28th ACM International Conference on Multimedia, Oct. 2020, pp. 484-493.

Siarohin et al. "First Order Motion Model for Image Animation", Conference on Neural Information Processing Systems (NeurIPS), Dec. 2019.

Zhou, Hang et al. "Pose-Controllable Talking Face Generation by Implicitly Modularized Audio-Visual Representation." 2021 IEEE/CVF Conference on Computer Vision and Pattern Recognition (CVPR) (2021): pp. 4176-4186.

* cited by examiner

SYNCHRONIZATION OF LIP MOVEMENT IMAGES TO AUDIO VOICE SIGNAL

TECHNICAL FIELD

This disclosure generally relates to video processing. More particularly, this disclosure relates to methods and systems for synchronization of lip movement images to an audio voice signal.

BACKGROUND

Lip synchronization generally refers to matching movements of the lips of an actor, speaker, or animated character in a video to an audio voice. Lip synchronization can be used in movies, television shows, animation, video games, and translations of pre-recorded videos to multiple languages. Currently existing solutions for lip synchronization have shortcomings and limitations. Specifically, existing solutions either do not allow generating high quality lip movements at appropriate times or require high performance computers that are not available to regular users.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for synchronization of lip movement images to an audio voice signal is provided. The method may include acquiring, by a computing device, a source video and dividing the source video into a set of image frames and a set of audio frames. The method may include generating, by the computing device, a vector database based on the set of image frames and the set of audio frames. A vector of the vector database may include a face vector and an audio vector. The face vector can be determined based on an image frame of the set of image frames. The audio vector may be determined based on an audio frame of the set of audio frames, such that the audio frame corresponds to the image frame. The method may include receiving, by the computing device, a target image frame and a target audio frame. The method may include determining, by the computing device, a target image vector based on the target image frame and a target audio vector based on the target audio frame. The method may include searching, by the computing device, the vector database to select a pre-determined number of vectors corresponding to the target image vector and the target audio frame. The method may include generating, by the computing device and based on the pre-determined number of vectors, an output image frame of an output video.

The source video can be acquired by capturing, by the computing device, a video featuring a user. The target image frame can be selected from the set of image frames generated based on the source video.

The face vector and the target image vector can be generated by a vocabulary encoder. The vocabulary may include a first pre-trained neural network. The face vector may include an angle of a rotation of a face in the image frame around an axis.

The audio vector and the target audio vector can be generated by a speech encoder. The speech encoder may include a second pre-trained neural network.

The selection of the pre-determined number of vectors may include determining a first metric based on the target image vector and the face vector, determining a second metric based on the target audio vector and the audio vector. The first metric may include a distance between the target image vector and the face vector. The second metric may include a scaled dot product of the target audio vector and the audio vector. The first metric and the second metric can be combined into a third metric. The pre-determined number of vectors for which the third metric is below a predetermined threshold can be then selected to determine vocabulary frames best matching to the target image vector and the target audio frame.

The method may include, prior to generating the output image frame, extracting style information from the set of image frames. The style information may indicate a presence or an absence of an emotional expression in a face in the image frames of the set of image frames. The output image frame can be generated based on the style information. The output image frame is generated by a decoder. The decoder may include a third pre-trained neural network.

According to another embodiment, a system for synchronization of lip movement images to an audio voice signal is provided. The system may include at least one processor and a memory storing processor-executable codes, wherein the processor can be configured to implement the operations of the above-mentioned method for synchronization of lip movement images to an audio voice signal.

According to yet another aspect of the disclosure, there is provided a non-transitory processor-readable medium, which stores processor-readable instructions. When the processor-readable instructions are executed by a processor, they cause the processor to implement the above-mentioned method for synchronization of lip movement images to an audio voice signal.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

DETAILED DESCRIPTION

Figure 1:
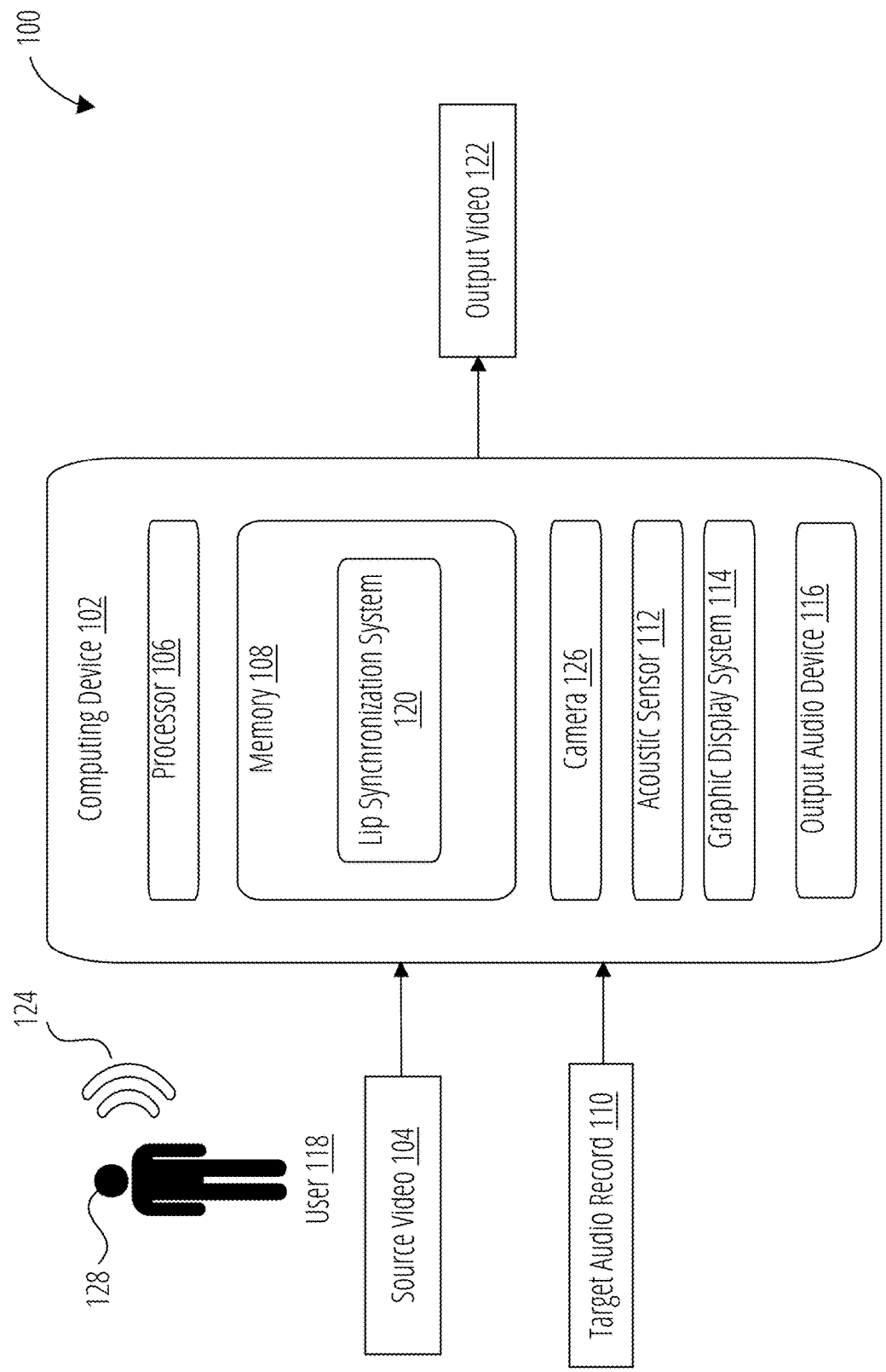
FIG. 1 illustrates an example environment in which systems and methods for synchronization of lip movements to an audio voice signal can be implemented.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The terms "can" and "may" shall mean "possibly be, but not limited to be."

This disclosure relates to methods and systems for synchronization of lip movement images to an audio voice signal. Some embodiments of the present disclosure allow receiving a source video featuring a person and an external target audio record including a speech. Then embodiments of the present disclosure allow generating an output video by synchronizing lip movements of the person in the source video so that the person in the output video looks like they are saying the speech in the target audio record. Unlike existing solutions for synchronization of lip movement images to a target audio record, embodiments of the present disclosure leverage face-speech vocabulary to generate frames of output video. The face-speech vocabulary can be generated based on the source video. Using the face-speech vocabulary allows generating lips and teeth of the person in an output video that appear more similar to lips and teeth of the person in the source video. Additionally, embodiments of the present disclosure provide a faster than real time process for lip synchronization, making it possible to create conversational live chat-bots.

According to an example embodiment, a method for synchronization of lip movement images to an audio voice signal may include acquiring a source video and dividing the source video into a set of image frames and a set of audio frames. The method may allow generating a vector database based on the set of image frames and the set of audio frames. A vector of the vector database may include a face vector and an audio vector. The face vector can be determined based on an image frame of the set of image frames. The audio vector can be determined based on an audio frame of the set of audio frames, such that the audio frame corresponds to the image frame. The method may include receiving a target image frame and a target audio frame. The method may include determining a target image vector based on the target image frame and a target audio vector based on the target audio frame. The method may allow searching the vector database to select a pre-determined number of vectors similar to the target image vector and the target audio frame. The method may include generating, by the computing device and based on the pre-determined number of vectors, an output image frame of an output video.

Referring now to the drawings, FIG. 1 shows an example environment 100 in which systems and methods for synchronization of lip movements to an audio voice signal can be implemented. Environment 100 may include a computing device 102. Computing device 102 may include a processor 106, a memory 108, an acoustic sensor 112, a camera 126, a graphic display system 114, and an output audio device 116. Computing device 102 may also include additional or other components necessary for operations of computing device 102. Computing device 102 may include fewer components that perform similar or equivalent functions to those depicted in FIG. 1.

In various embodiments, computing device 102 may include, but is not limited to, a notebook computer, a desktop computer, a tablet computer, a smart phone, a media player, a smart television set, in-vehicle infotainment, a smart home device, and the like. In some embodiments, computing device 102 can be a cloud-based computing resource(s) shared by multiple users. The cloud-based computing resource(s) can include hardware and software available at a remote location and accessible over a data network. The cloud-based computing resource(s) can be dynamically re-allocated based on demand. The cloud-based computing resource(s) may include one or more server farms/clusters including a collection of computer servers that can be co-located with network switches and/or routers.

Processor 106 may include hardware and/or software, which is operable to execute instructions stored in memory 108. For example, memory 108 may include modules of a lip synchronization system 120. The modules may include instructions executable by processor 106. The processor 106 may include general purpose processors, video processors, audio processing systems, and so forth. The processor 106 may perform floating point operations, complex operations, and other operations, including synchronization of lip movement images to an audio voice signal.

Acoustic sensor 112 can include one or more microphones to capture acoustic signal, such as, for example the voice 124 of user 118. Computing device 102 may include multiple acoustic sensors 112 spaced a distance apart to allow processor 106 to perform a noise and/or echo reduction in received acoustic signals.

Camera 126 may include a lens system for focusing light onto an image sensor, which converts the optical information into an electronic format. Camera 126 may capture moving visual images, such as, for example the face 128 of user 118 speaking or singing, and record the visual images into memory 108.

Output audio device 116 may include any device which provides an audio output to a listener (for example, the user 118). Output audio device 116 may include one or more speaker(s), an earpiece of a headset, or a handset.

Graphic display system 114 may be configured to display a video content of the media streamed by or stored on computing device 102. Graphic display system 114 may include hardware components like monitors or screens, as well as software tools for generating and manipulating visual content.

Processor 106 can be configured to receive video and acoustic signal from a source, for example, user 118, via acoustic sensor 112 and camera 126. Video and acoustic signal may feature images of the face 128 and also the voice 124 of the user 118. Processor 106 may process the video and acoustic signal to obtain a source video 104. To generate source video 104, user 118 may talk for a pre-determined time (for example, 20 seconds or more). During recording of source video 104, the face 128 of user 118 should be visible and turned straight to the camera 126 and the mouth of user 118 may not be covered with any objects. Source video 104 can be kept in memory 108. In other embodiments, source video 104 can be uploaded to computing device 102 from an external computing device.

The computing device 102 may receive a target audio record 110. Target audio record 110 may be different from an audio track present in source video 104. The target audio record 110 may include a speech or song pronounced in the same language as a speech or song present in source video 104.

When executing modules of lip synchronization system 120, the processor 106 may generate, based on target audio record 110 and source video 104, an output video 122. The computing device 102 may further display output video 122 via graphic display system 114 and output audio device 116. In the output video 122, user 118 may look like they are pronouncing a speech or singing a song present in the target audio record 110. The personal characteristics of voice 124 of user 118, such as pitch, tone, timbre, volume, accents, articulations, and others, may not necessarily be the same as in source video 104.

Figure 2:
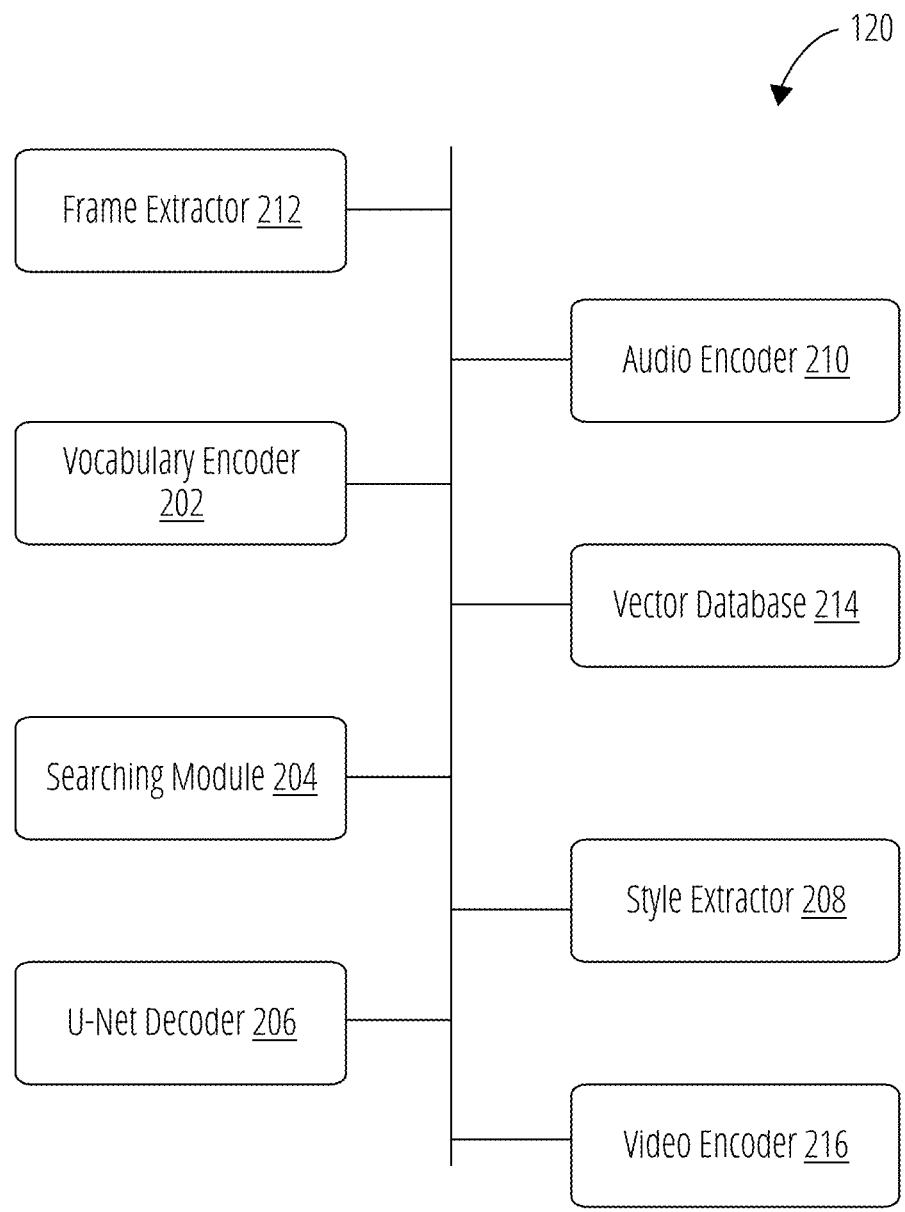
FIG. 2 is a block diagram of a lip synchronization system, according to an example embodiment.

FIG. 2 is a block diagram of lip synchronization system 120, according to an example embodiment. Lip synchronization system 120 may include a frame extractor 212, an audio encoder 210, a vocabulary encoder 202, a vector database 214, a searching module 204, a style extractor 208, a U-net decoder 206, and a video encoder 216. Lip synchronization system 120 may also include additional or other modules necessary for operations of computing device 102. Lip synchronization system 120 may include fewer components that perform similar or equivalent functions to those depicted in FIG. 2. The modules of lip synchronization system 120 can be stored in memory 108 as instructions executable by processor 106.

Frame extractor 212 may process source video 104 to extract face frames and sound frames. During processing, frame extractor 212 may detect the face 128 of user 118 in each of frames of source video 104 and determine face bounding boxes defining boundaries of the face 128 in the frames of source video 104. The images of face 128 can be cropped out from frames of source video 104 and resized to the same image resolution to obtain face frames. The sound frames can be extracted from audio track of source video 104. Each of the sound frames align in time with corresponding face frames. A sound frame may correspond to a time of one phoneme, which typically lasts around 40 to 60 milliseconds.

Figure 17:
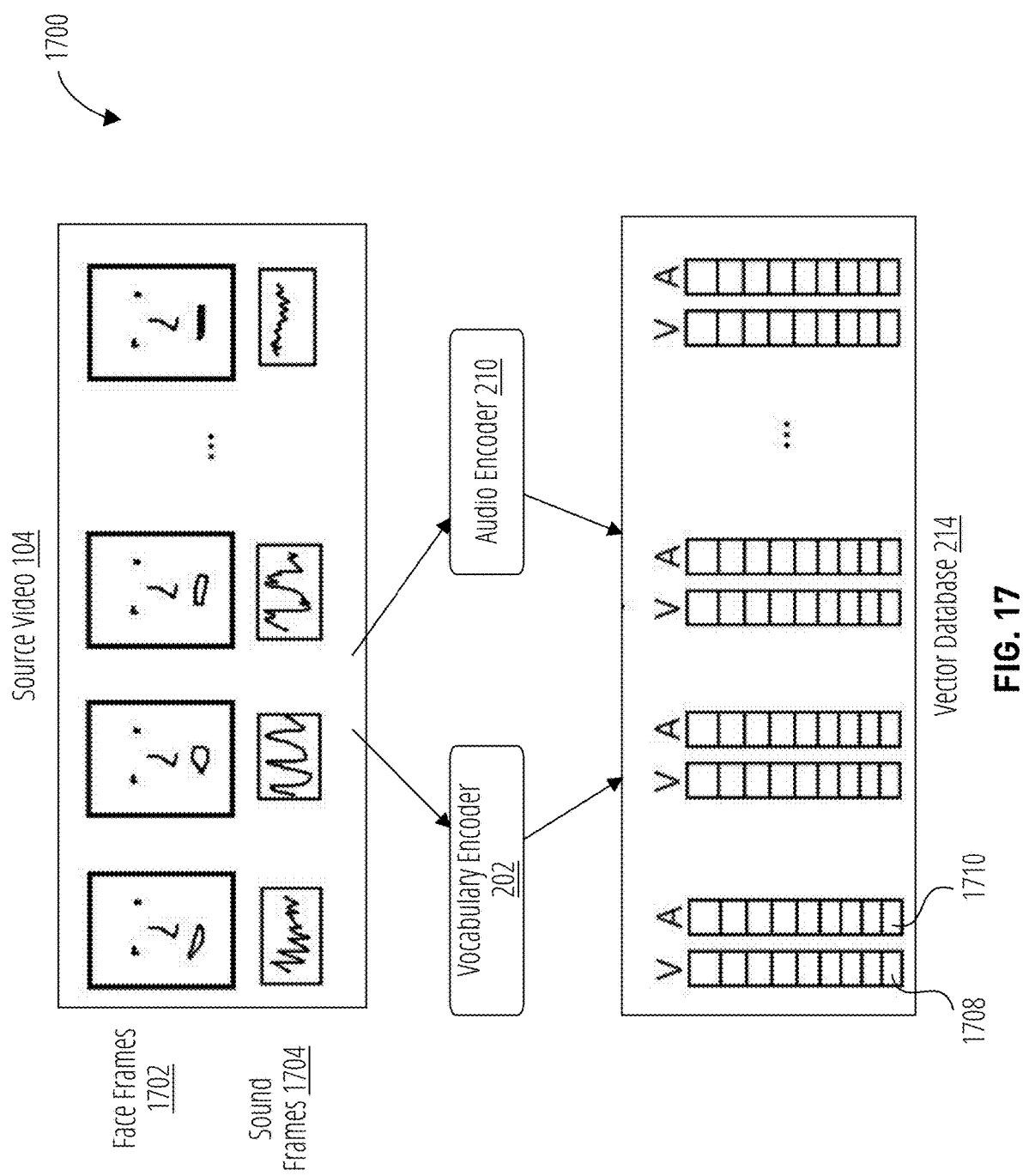
FIG. 17 is a schematic showing construction of a vector database, according to some example embodiments of the present disclosure.

Details of vocabulary encoder 202, audio encoder 210, and vector database 214 (also referred to as a vocabulary) are described in FIG. 17. Details of searching module 204, style extractor 208, and U-net decoder 206 are described in FIG. 18.

Figure 3:
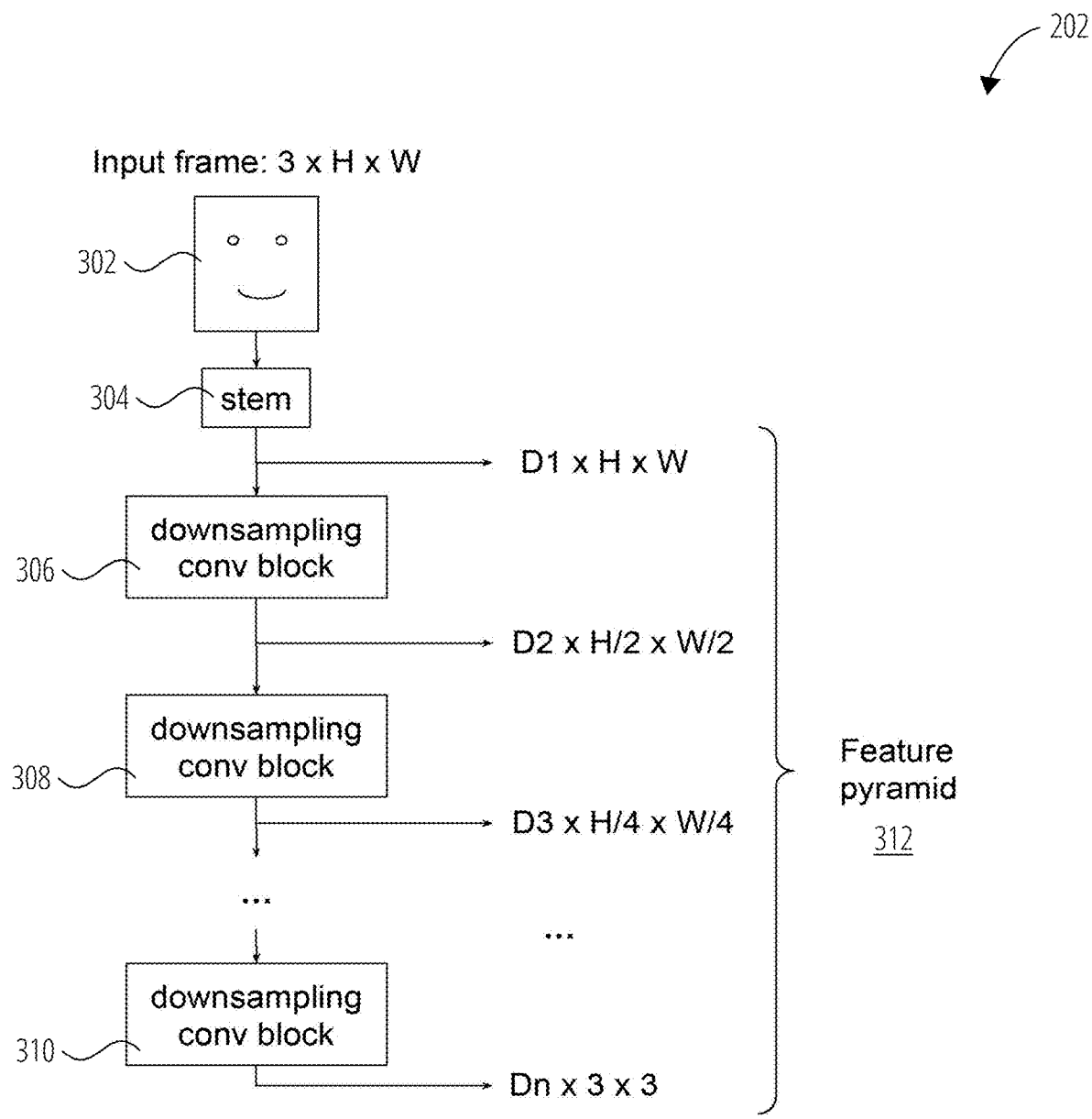
FIG. 3 is a schematic diagram of a vocabulary encoder, according to an example embodiment.

FIG. 3 is a schematic diagram of a vocabulary encoder 202, according to an example embodiment. The structure of the vocabulary encoder 202 follows a typical convolutional encoder structure, where an input frame 302 in RGB format (i.e., consisting of pixels containing three color channels: red, green, and blue) with dimensions [3×H×W] is fed to stem (structural transformation and encoding) convolution 304 first. The stem convolution 304 projects each pixel to a higher dimensional space while keeping spatial resolution unchanged (D1×H×W). The resulting feature map is then passed through a set of downsampling convolutional blocks including a first downsampling convolutional block 306 (provides dimensions [D2×H/2×W/2]), a second downsampling convolutional block 308 (provides dimensions [D3× H/4×W/4]), and so forth until the last downsampling convolutional block 310 (provides dimensions [Dn×3×3])). Each of the convolutional blocks reduces spatial resolution two times. As a result, a set of feature maps with gradually decreasing resolutions is produced, thus forming a feature pyramid representation 312 of the input frame 302.

To encode a target frame that has the mouth part of the face masked, another encoder is used. The encoder of the target frame follows exactly the same scheme as the vocabulary encoder 202, with one difference: namely, all convolutions use the mouth mask.

Figure 4:
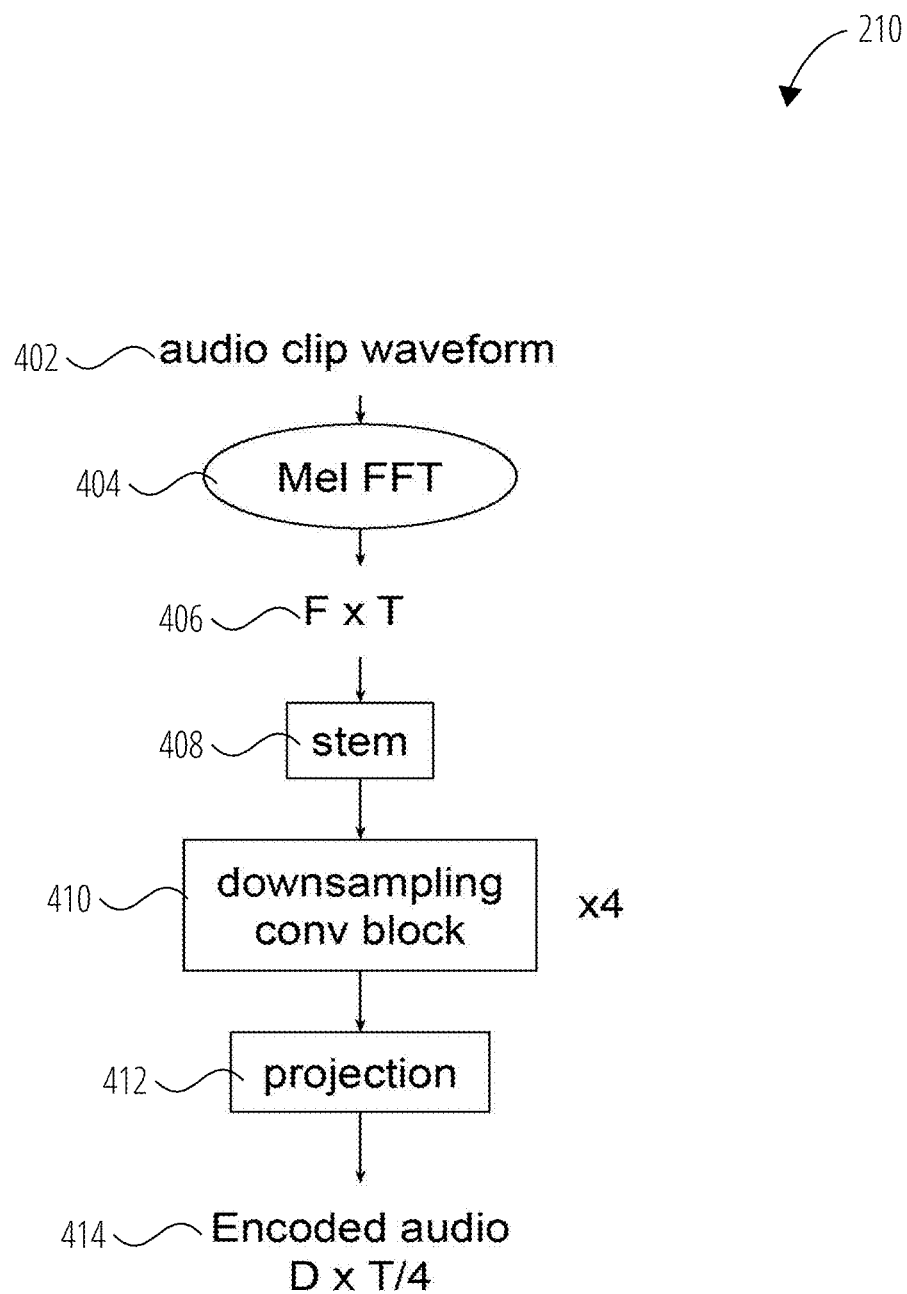
FIG. 4 is a schematic diagram of an audio encoder, according to an example embodiment.

FIG. 4 is a schematic diagram of an audio encoder 210, according to an example embodiment. An audio waveform signal 402 corresponding to a frame is passed through a Fast Fourier Transform (FFT) process 404. The spectrum is then converted to a mel-scale and the logarithm of the values is computed. The FFT process 404 uses a fixed small sliding window. Thus, a sequence of mel-spectra is produced for each video frame. The end result of the FFT module is a spectrogram image with dimensions of [F×T], where F is the resolution of mel-spectrum and T is the time resolution, as shown in block 406. The spectrogram image is then passed to a convolutional network, which follows a typical encoder scheme, as shown in block 408 (STEM) and block 410

(downsampling convolutional block). A final feature map is then projected in block 412 to form an embedding representation 414 (also referred herein to as audio embedding or an embedding) of an audio signal. The embedding representation 414 has dimensions of [DxT/4]. All subsequent modules that take the audio as an input receive this embedding representation 414 of the audio signal.

Figure 5:
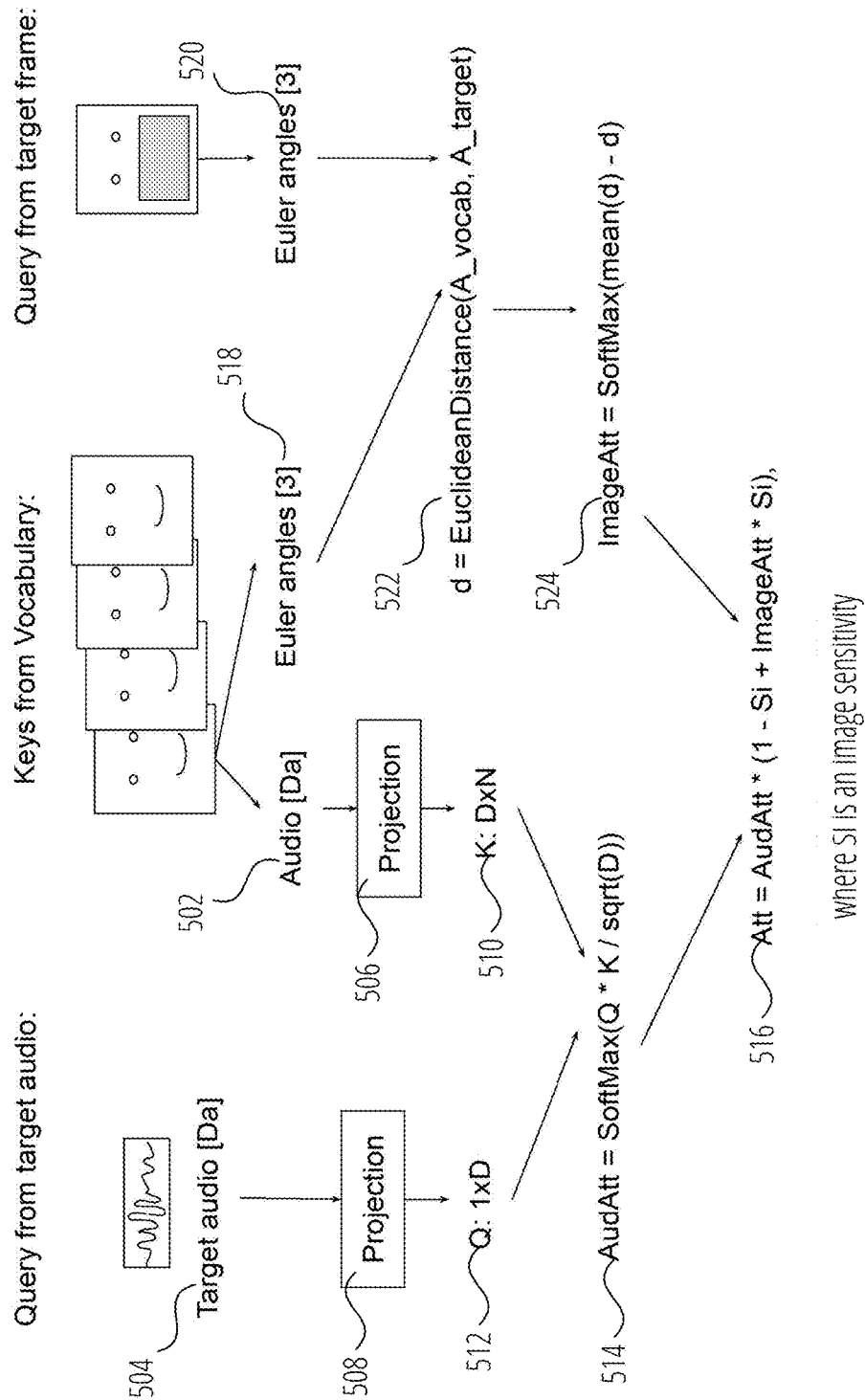
FIG. 5 is a schematic diagram illustrating operations performed by a searching module, according to an example embodiment.

FIG. 5 is a schematic diagram illustrating operations performed by the searching module 204, according to an example embodiment. The searching module 204 may be used for selection of reference frames. Audio embeddings 502 from a vector database (shown as a vector database 214 in FIG. 2) and audio embeddings 504 of a target speech sound are projected in block 506 and block 508, respectively, to form audio keys 510 and query 512, respectively. The audio keys 510 and the query 512 are then combined using the "scaled dot product attention" formula to produce audio attention weights 514 for each vocabulary frame. A large attention weight means a better fit for the corresponding vocabulary frame. Video frame embeddings (Euler angles 518) of the vocabulary frames and video frame embeddings (Euler angles 520) of the target frame are combined using the Euclidean distance 522 and the SoftMax function to produce similar image attention weights 524. Then, the audio attention weights 514 and the image attention weights 524 are combined using weighted multiplication to produce final ranking weights 516 for the vocabulary frames. The four frames with top rankings are selected from the vocabulary and passed on to the lip synchronization system.

Figure 6:
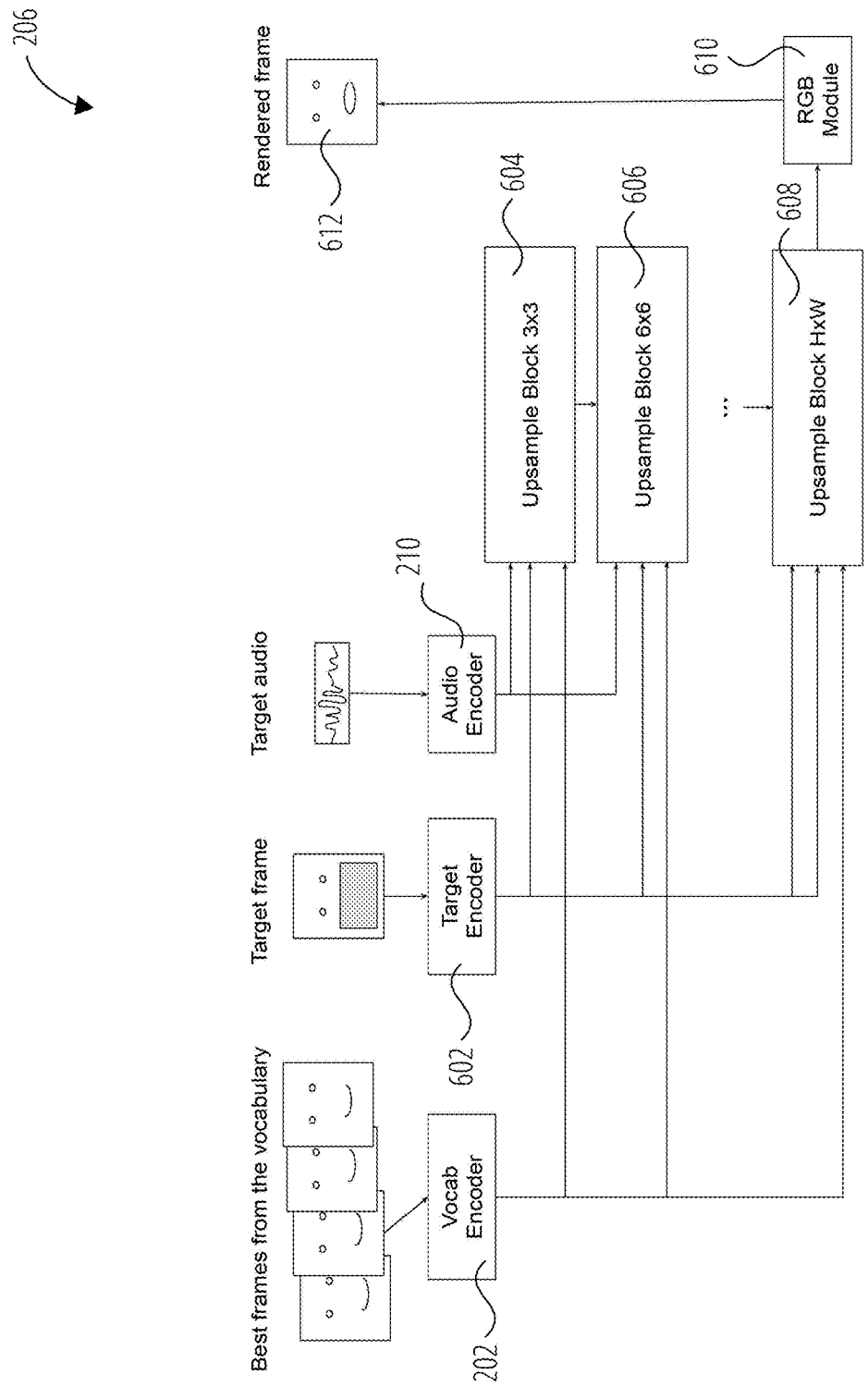
FIG. 6 is a schematic diagram illustrating operations performed by a U-net decoder, according to an example embodiment.

FIG. 6 is a schematic diagram illustrating operations performed by a U-net decoder 206, according to an example embodiment. The U-net decoder 206 receives an input that includes encoded audio embeddings received from audio encoder 210, a feature pyramid of each of the selected vocabulary frames received from vocabulary encoder 202, and a feature pyramid of masked target frames received from target encoder 602. The U-net decoder 206 follows the common scheme of the U-Net, where each convolutional block increases resolution two times. Each convolutional block takes the corresponding resolution from the feature pyramids. The audio is passed in the same form to each one of the upsample blocks 604, 606, and 608. Each upsample block 604, 606, . . . and 608 produces a feature map of the decoded image. The feature map together with other necessary tensors is passed from one block of the upsample blocks 604, 606, and 608 to another. After the last upsampling step, RGB module 610 produces a target frame 612 with the mouth following the target speech audio.

Figure 7:
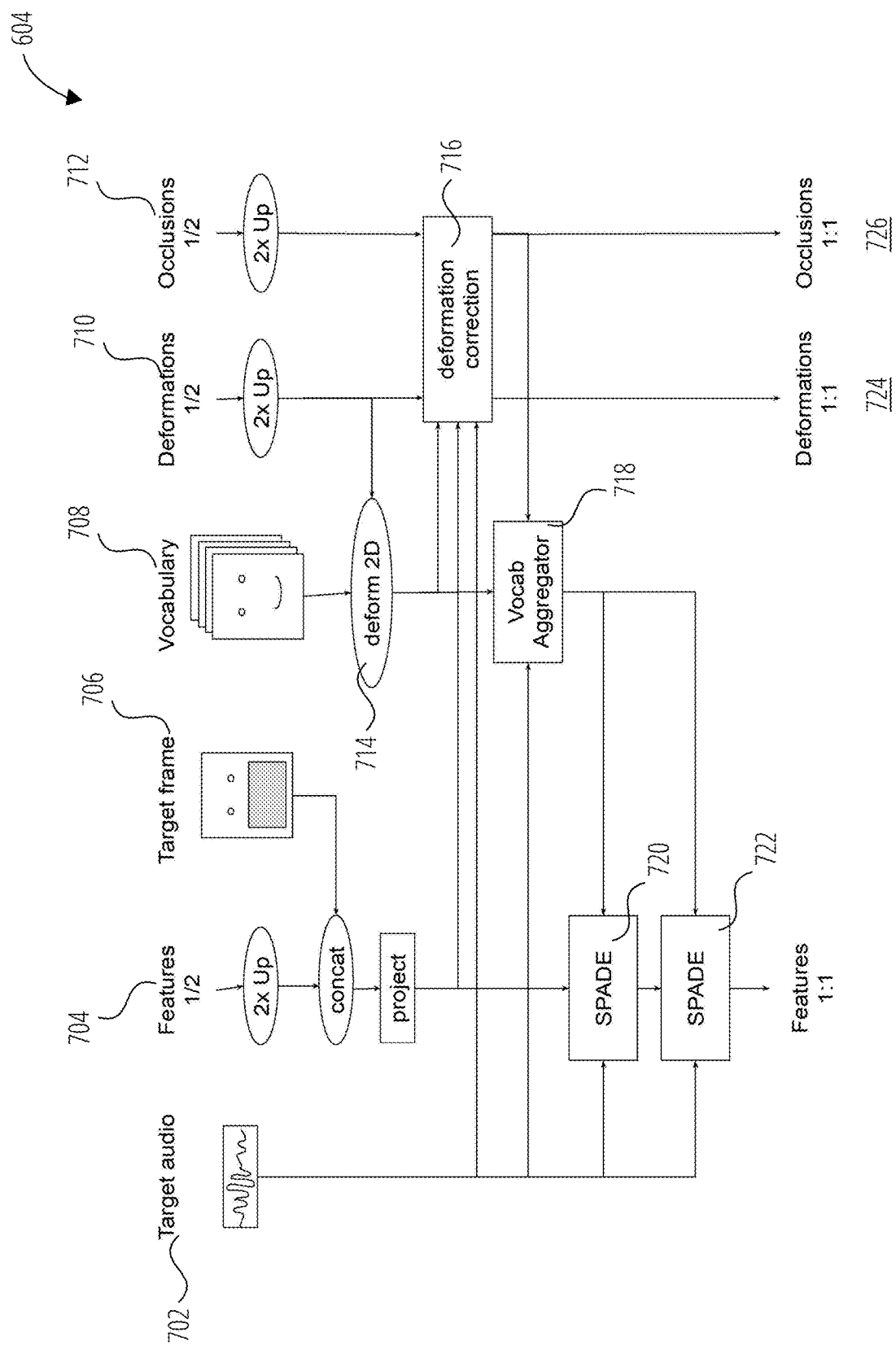
FIG. 7 is a schematic diagram illustrating in detail upsample blocks of the U-net decoder, according to an example embodiment.

FIG. 7 is a schematic diagram illustrating in detail any of the upsample blocks 604, 606, and 608 of U-net decoder 206, according to an example embodiment. Inputs to the upsample block 604 may include the following six components. First, audio embedding of the target audio 702 may be passed to many submodules to drive generation. Second, the input may include features 704 from the preceding upsample block. Third, the inputs may include embeddings of the masked target frame 706. Fourth, the inputs may include best vocabulary frames embeddings (vocabulary features 708) from the vocabulary encoder. Fifth, the inputs may further include two-dimensional (2D) deformation warp field 710 to help match vocabulary frames to the target frame. Sixth, the inputs may include an occlusion map 712 to help with merging many vocabulary frames into the mouth region of the target frame.

The 2D deformation warp field 710, occlusion map 712, and features 704 are received from the preceding upsample block, and thus they have a half of the spatial resolution. To obtain the current resolution of the upsample block, these feature maps are upsampled using simple bilinear upsampling. After upsampling, the features are concatenated with the masked target frame's features and projected to the final feature dimension space. Vocabulary frames are deformed according to the corresponding upsampled warp field in block 714. Then deformation fields and occlusion maps are corrected using a deformation correction module 716 to produce corrected deformations 724 and corrected occlusions 726. The corrected occlusions 726 and the target audio 702 are used to aggregate the vocabulary frames into a single feature map. Finally, the target audio 702, features 704, and aggregated vocabulary are aggregated using a vocabulary aggregator 718 and then sent to a set of spatially adaptive denormalization (SPADE) blocks 720 and 722 to generate a target face image.

Figure 8:
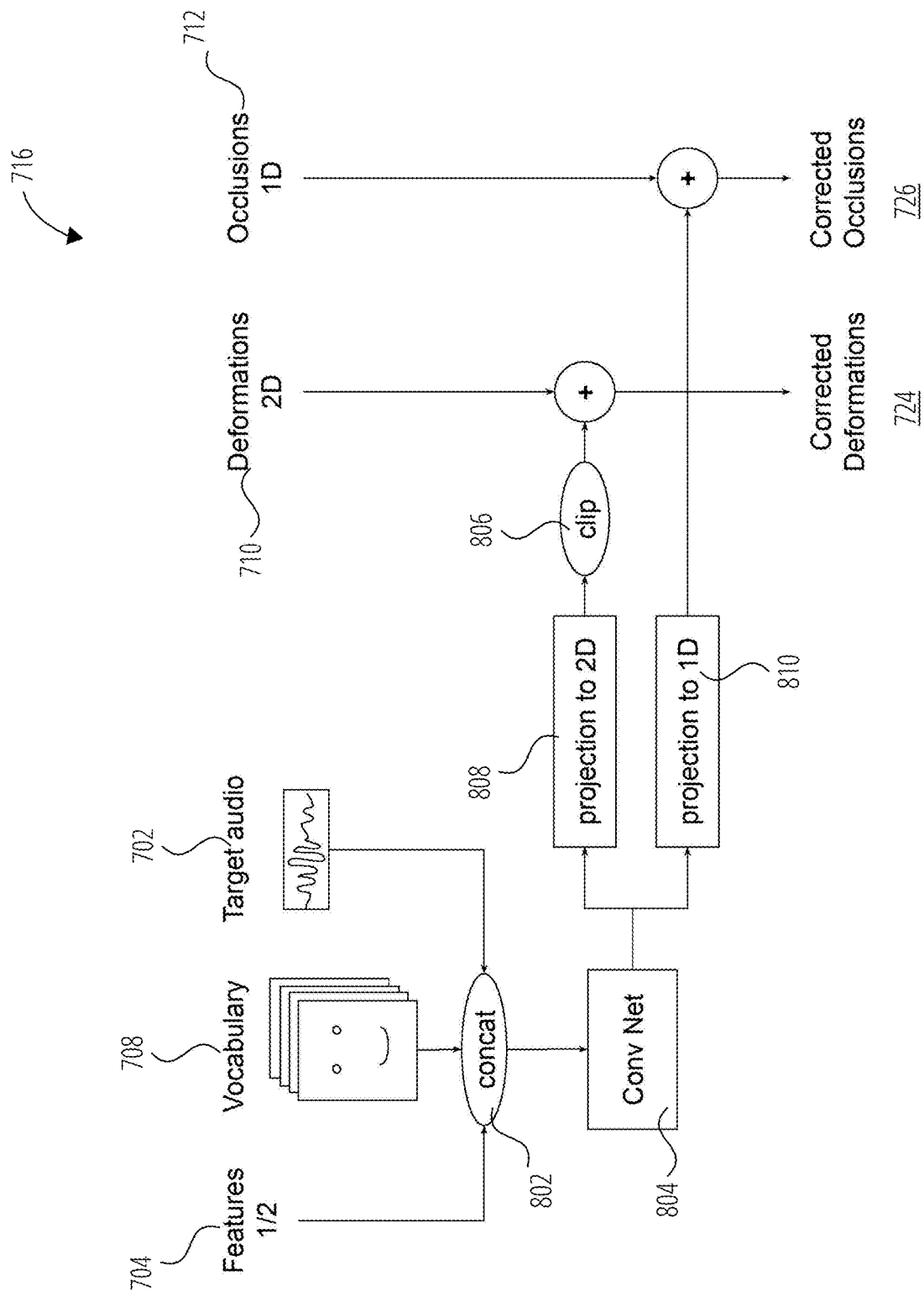
FIG. 8 is a schematic diagram illustrating in detail a deformation correction module, according to an example embodiment.

FIG. 8 is a schematic diagram illustrating in detail the deformation correction module 716 shown in FIG. 7, according to an example embodiment. The features 704, vocabulary features 708 received from the vocabulary encoder, and target audio 702 are concatenated in block 802 along feature dimension, so that audio features are appended to each pixel in the final feature map. The combined feature map is then sent to a set of convolutional blocks 804. The output feature map is used to produce corrections to the 2D deformation warp field 710 and corrections to the occlusion map 712, based on which corresponding projections are made in blocks 808 and block 810. The warp field correction values are clipped in block 806 to avoid distortions. All corrections are additive, resulting in production of corrected deformations 724 and corrected occlusions 726.

Figure 9:
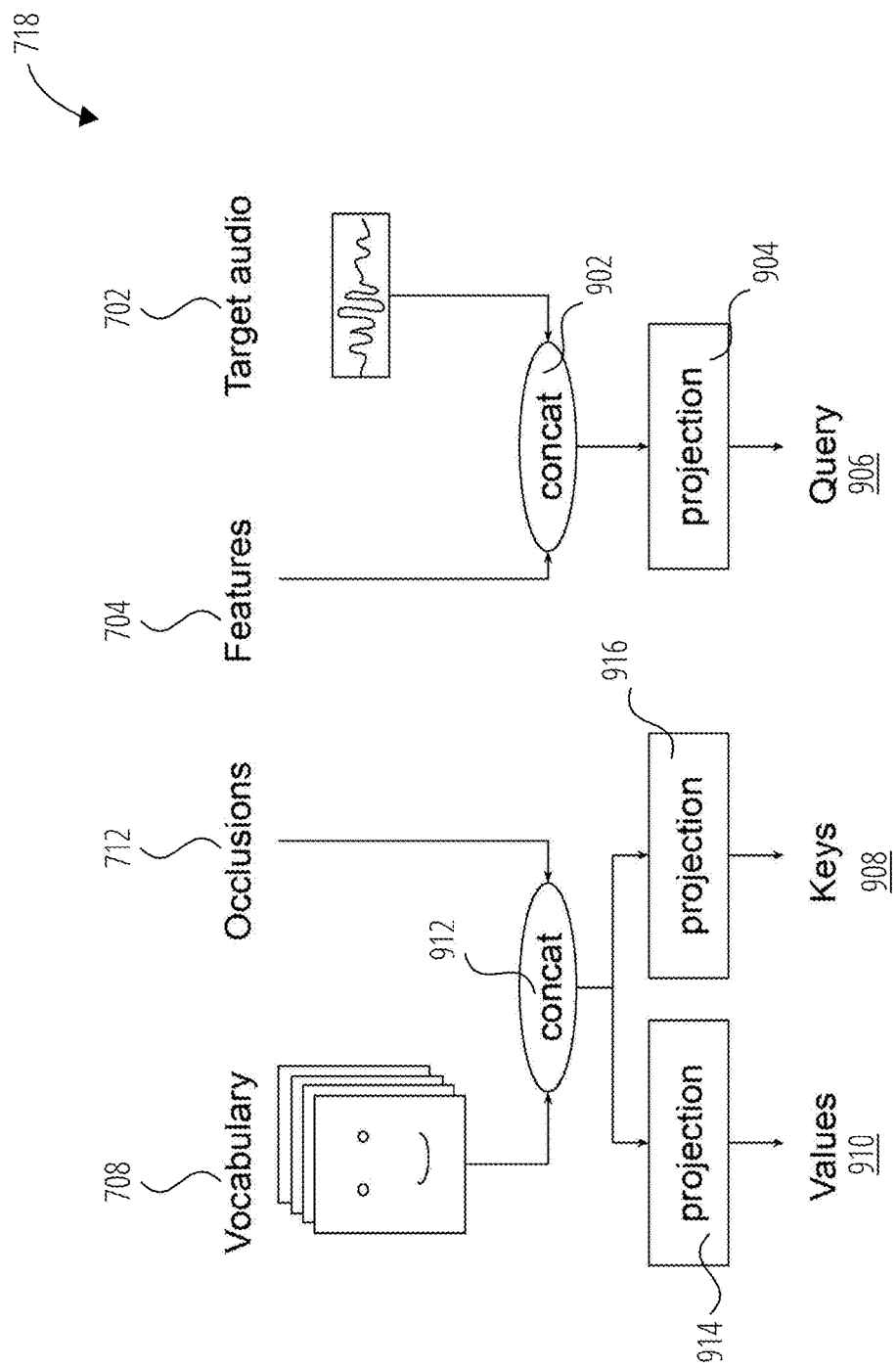
FIG. 9 is a schematic diagram illustrating in detail a vocabulary aggregator, according to an example embodiment.

FIG. 9 is a schematic diagram illustrating in detail the vocabulary aggregator 718 shown in FIG. 7, according to an example embodiment. The goal of the vocabulary aggregation is to reduce feature maps from a predetermined number of vocabulary frames to one feature map. The reduction follows scaled dot product attention logic. In block 902, the features 704 and the target audio 702 are combined and, in block 904, the result of the combination is projected into a query 906. In block 912, vocabulary features 708 received from the vocabulary encoder and occlusion maps 712 are combined. In block 914, the result of the combination is projected into values 910 for the attention. In block 916, the result of combination is projected into keys 908. Each pixel in the vocabulary feature maps is attended to independently.

Figure 10:
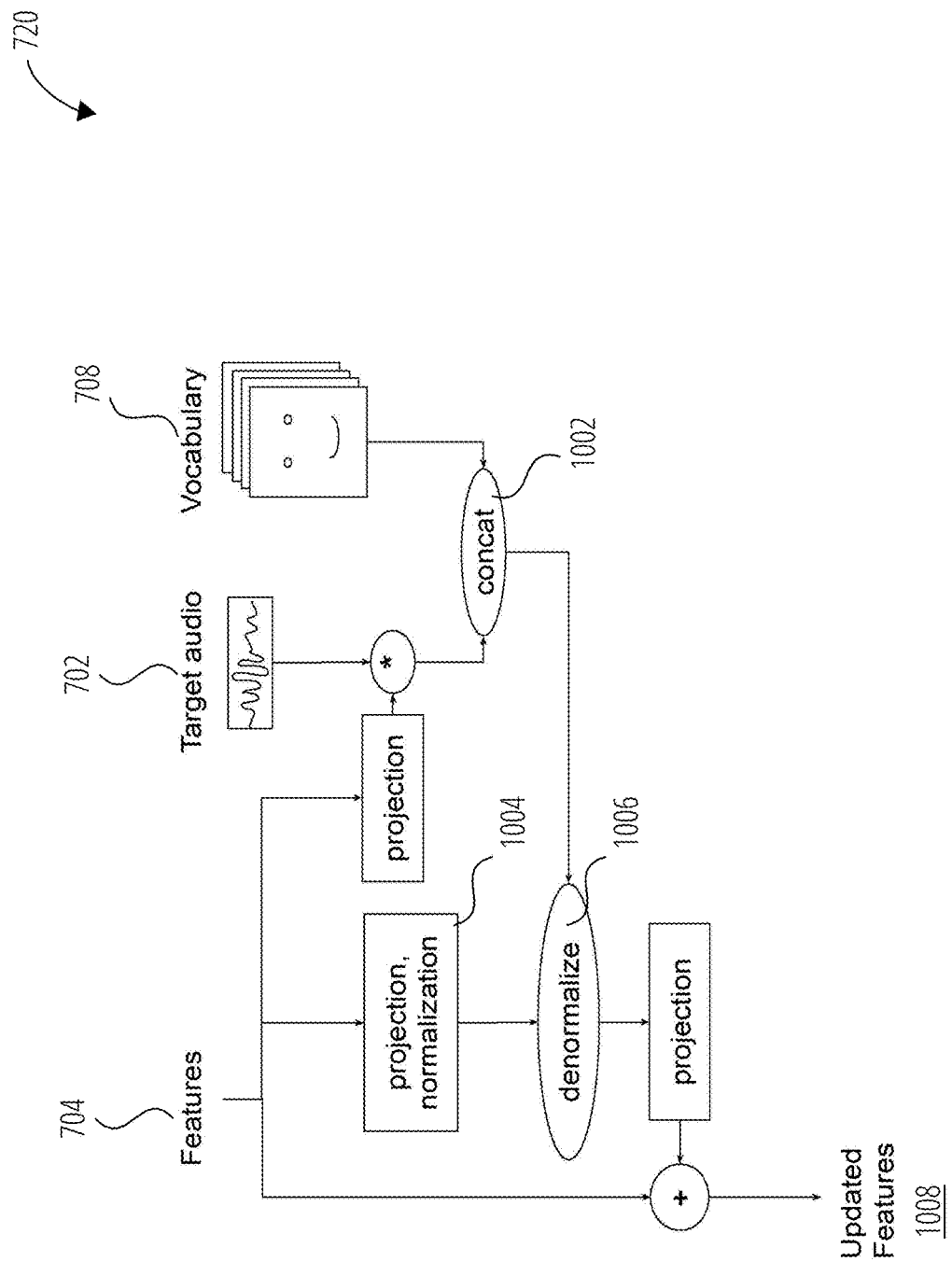
FIG. 10 is a schematic diagram illustrating in detail a spatially-adaptive denormalization (SPADE) block, according to an example embodiment.

FIG. 10 is a schematic diagram illustrating in detail the SPADE block 720 shown in FIG. 7, according to an example embodiment. The SPADE block 720 is used to take a conditioning signal into account when processing main features. The conditioning is a concatenation of the target audio 702 and the vocabulary features 708, as shown in block 1002. Main features 704 are projected and normalized in block 1004, and then denormalized in block 1006 using the conditional affine transformation, where affine coefficients are computed from the target audio 702 and the vocabulary features 708 to produce updated features 1008.

Figure 11:
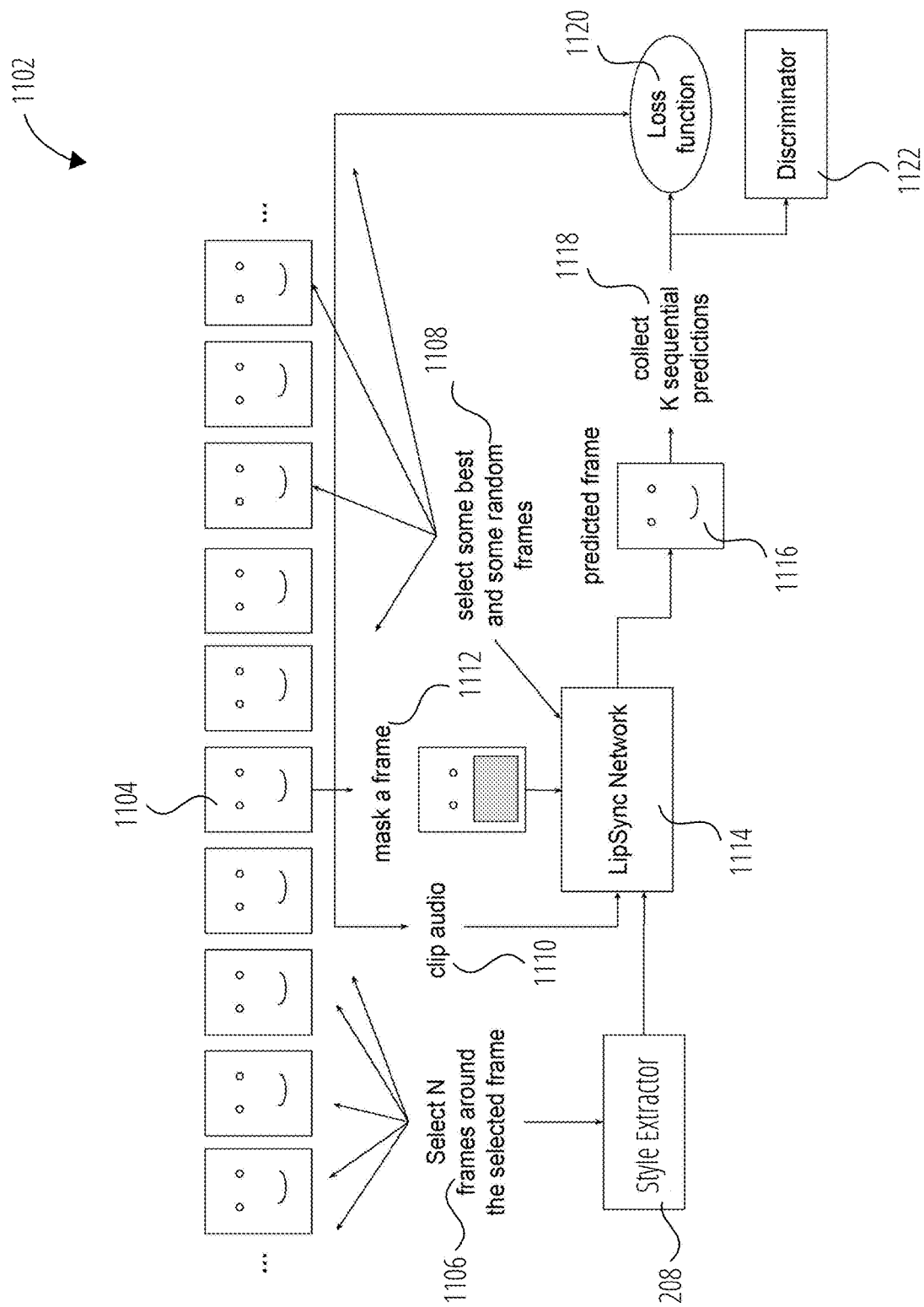
FIG. 11 is a schematic diagram illustrating a training process of a neural network, according to an example embodiment.

FIG. 11 is a schematic diagram illustrating a training process 1102 of a neural network, according to an example embodiment. The training process 1102 commences with sampling a random video from a dataset by selecting a frame sequence 1104 in a random video at a random location. Then a random frame is chosen in step 1106. To train a style extractor 208, a set of a sufficiently large number of frames around the chosen frame is sampled and passed to the style extractor 208.

To train a vocabulary attention subnetwork, a set of best frames and some random frames are sampled in step 1108, so that these frames are not too close to the chosen frame in order to avoid leaking correct mouth shape information to the decoder. The audio for the chosen frame is extracted in step 1110 and the chosen frame is masked in step 1112. All these frames together with audio are sent to the lip synchronization system shown as a LipSync network 1114, where they are encoded by the corresponding encoders, and then the decoder produces the target frame shown as a predicted frame 1116.

In order to provide a loss signal to the network, the whole procedure is repeated to produce K consecutive video frames, shown in step 1118, for a loss function 1120. The loss function 1120 is a linear combination of a number of pixel-wise losses and a SyncNet loss associated with a SyncNet subnetwork. There is also an adversarial loss signal coming from a discriminator 1122. The plurality of neural networks is trained end-to-end as a generative adversarial network (GAN).

Figure 12:
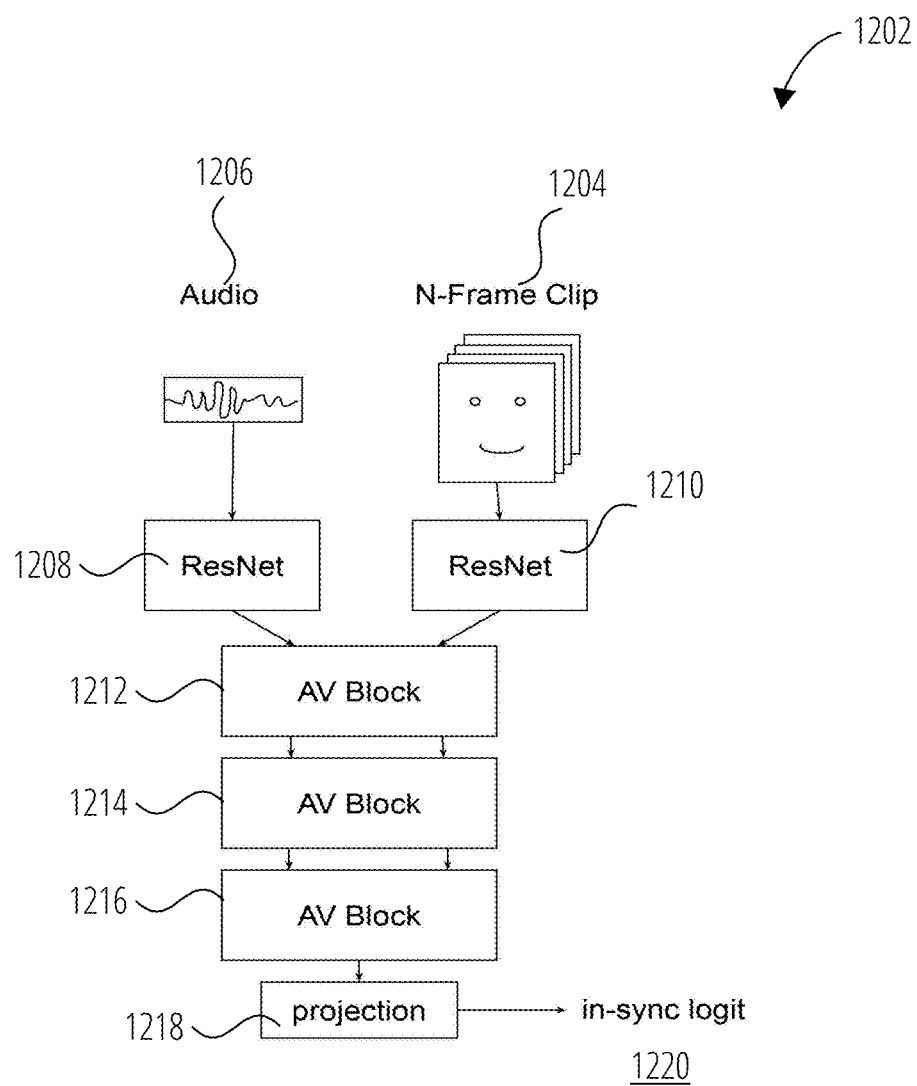
FIG. 12 is a schematic diagram illustrating a SyncNet subnetwork, according to an example embodiment.

FIG. 12 is a schematic diagram illustrating a SyncNet subnetwork 1202, according to an example embodiment. The SyncNet subnetwork 1202 is configured to control the quality of lip synchronization. The SyncNet subnetwork 1202 receives a set of consecutive frames 1204 and the audio 1206 as an input and outputs a logit for binary classification. There are two classes, namely "in-sync" and "out-of-sync." The SyncNet subnetwork 1202 is not trained during the lip synchronization training. The SyncNet subnetwork 1202 is pre-trained using a simple self-supervised scheme; namely, a sequence of frames is randomly sampled from a random video and audio is sampled 50% of the time from a different part of the video, so that the SyncNet subnetwork 1202 sees in-sync and out-of-sync scenarios. The SyncNet subnetwork 1202 has two small encoders 1208 and 1210, which independently encode audio and video frames. The encoded audio and video is then sent to a set of AV blocks 1212, 1214, and 1216. Each AV block 1212, 1214, and 1216 has audio and video intermixing to allow for detecting in-sync and out-of-sync samples. Finally, a projection 1218 converts features into a logit 1220, which is then passed to the binary cross entropy loss.

Figure 13:
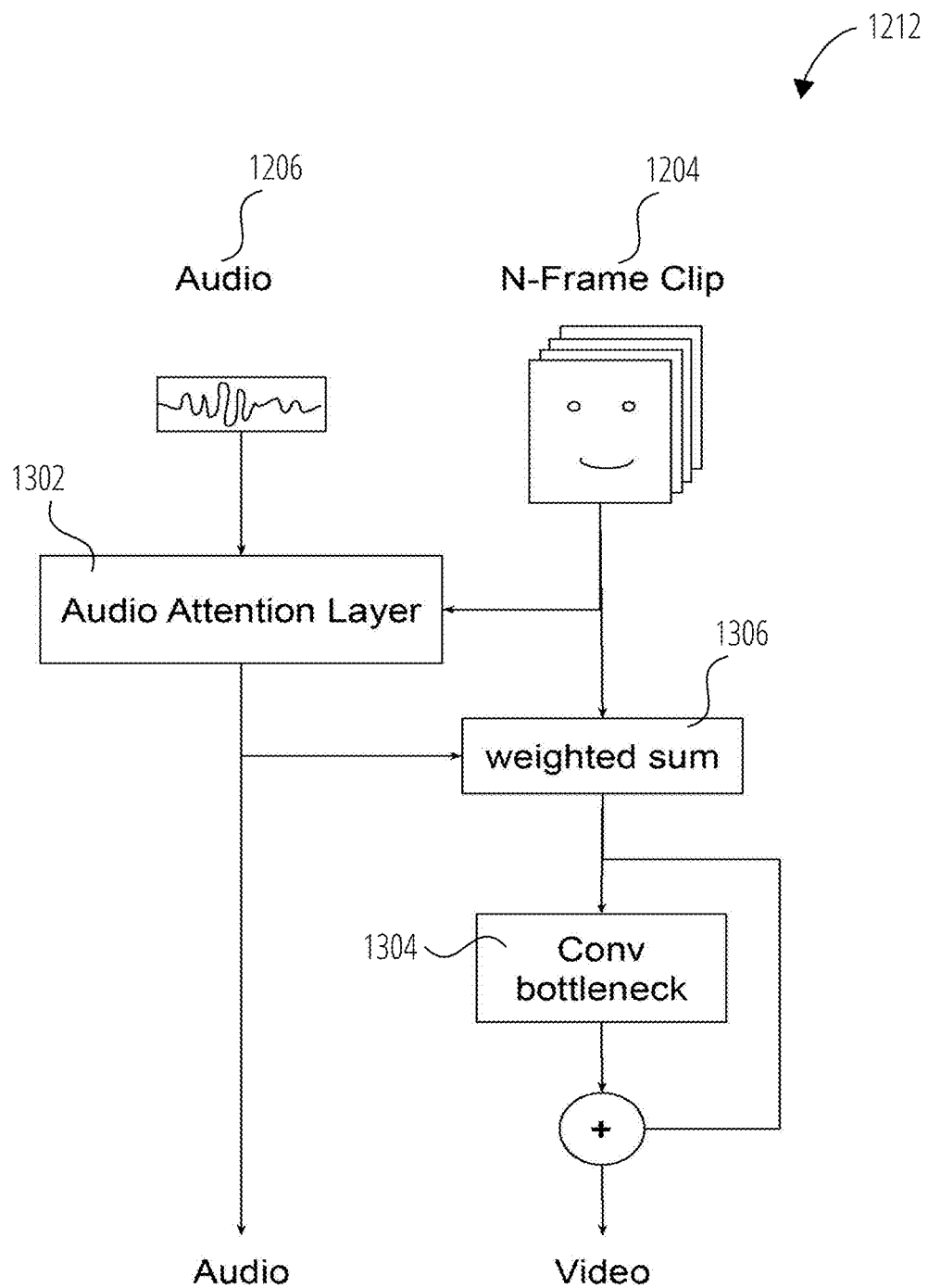
FIG. 13 is a schematic diagram illustrating an audiovideo (AV) block, according to an example embodiment.

FIG. 13 is a schematic diagram illustrating an AV block 1212, according to an example embodiment. The audio 1206 is processed using an audio attention layer provided by an audio attention module 1302 and then linearly combined with the frames 1204 of the video in block 1306. The combined video is then passed through a convolutional residual block 1304.

Figure 14:
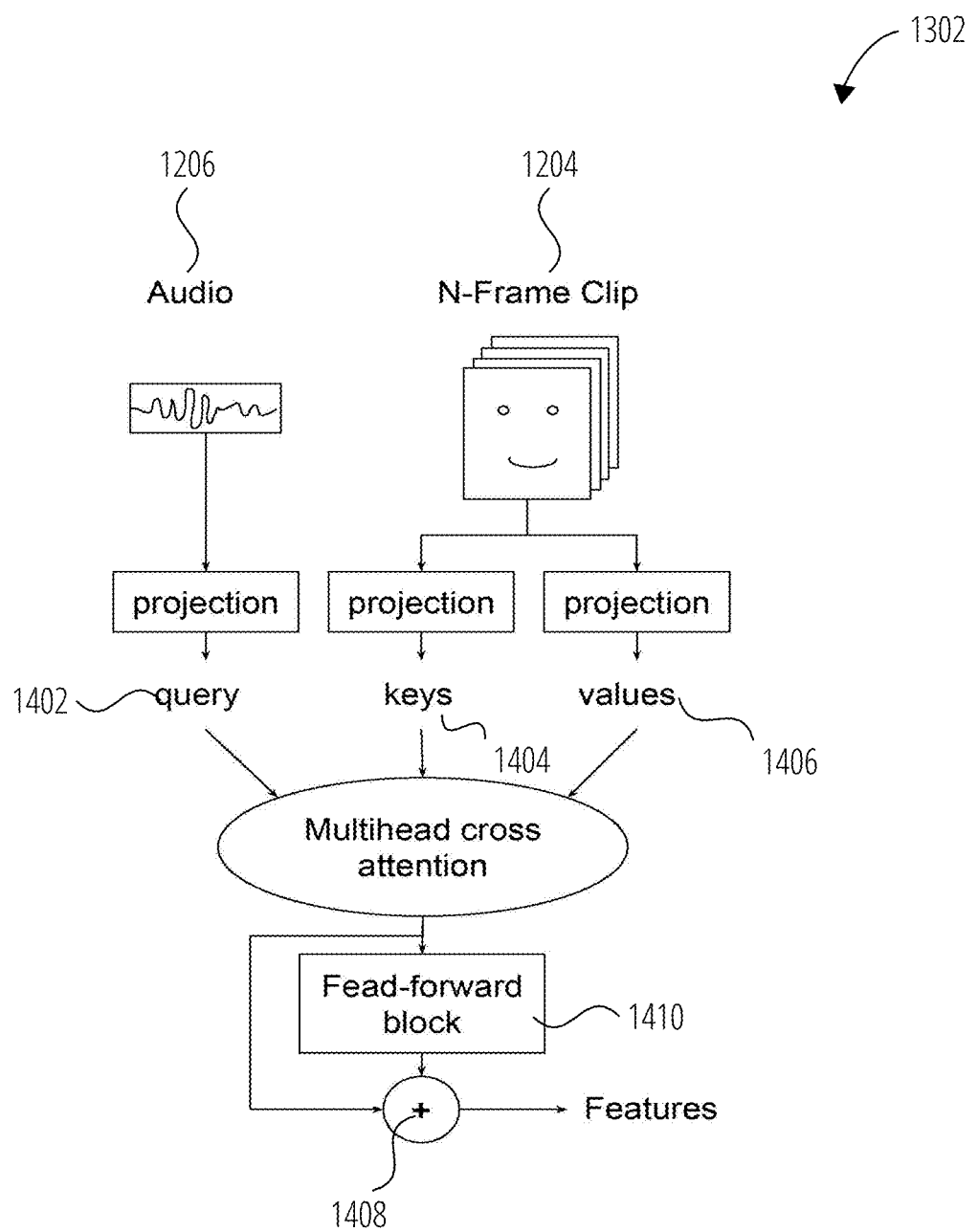
FIG. 14 is a schematic diagram illustrating an audio attention module, according to an example embodiment.

FIG. 14 is a schematic diagram illustrating the audio attention module 1302, according to an example embodiment. The audio attention module 1302 follows the standard multi-head cross attention layer, where a query 1402 is produced from the audio, while keys 1404 and values 1406 are produced from the image. Thus, the audio attends to each pixel in the frame. The combined result is added back to the audio in block 1408 and processed with a feed-forward subnetwork 1410.

Figure 15:
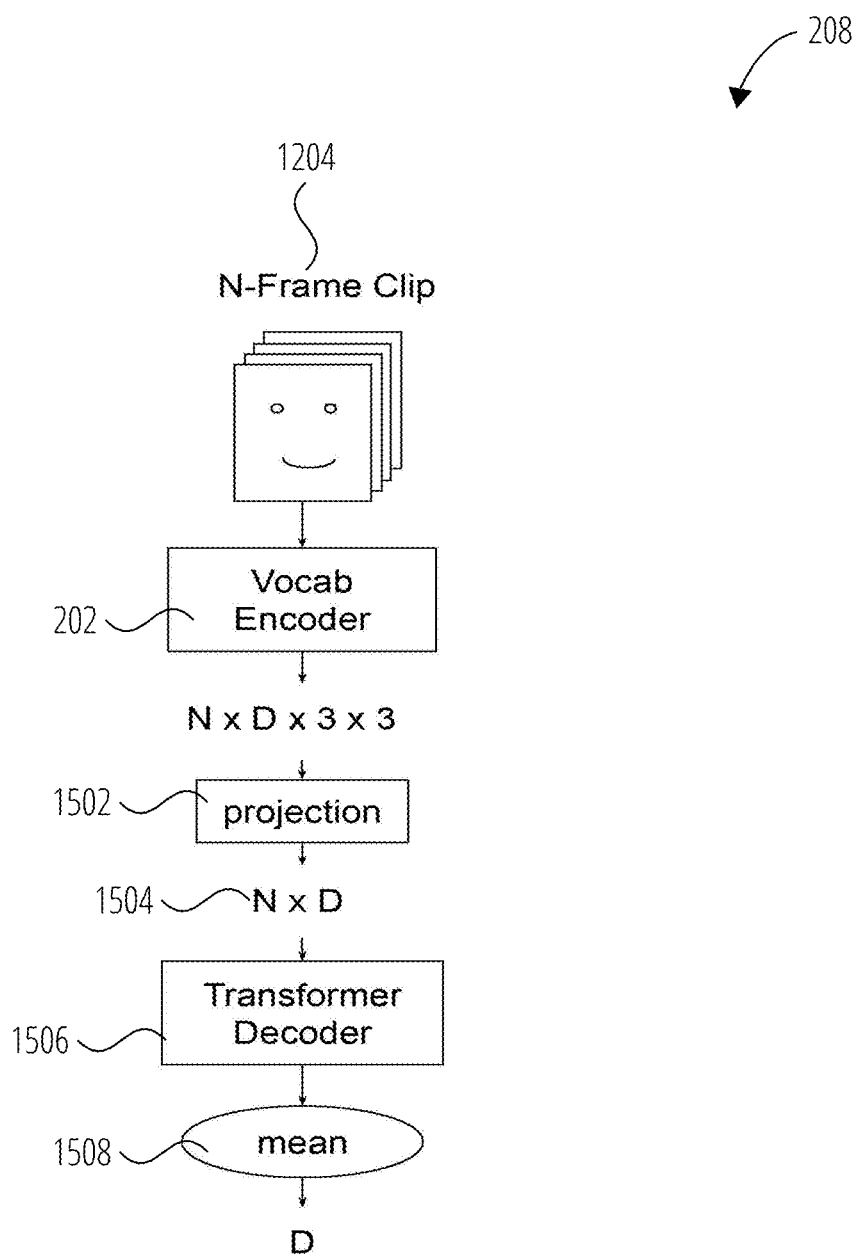
FIG. 15 is a schematic diagram illustrating a style extractor, according to an example embodiment.

FIG. 15 is a schematic diagram illustrating style extractor 208, according to an example embodiment. The style extractor 208 receives N frames 1204 sampled around the chosen frame as an input. The goal of the style extraction is to extract some common low dimensional information from the set of N frames 1204. The style extractor 208 may learn to extract the kind of information that is not contained in the audio signal. Such information may include emotions and speaking style. A set of frames is first sent as independent images to the vocabulary encoder 202, and then projected in block 1502 into a lower dimensional space with aggregation across all pixels, forming a sequence 1504 of [N×D] dimensions. The sequence is then sent to standard transformer decoder network 1506. The final aggregation across frames is performed using an averaging operation 1508.

Figure 16:
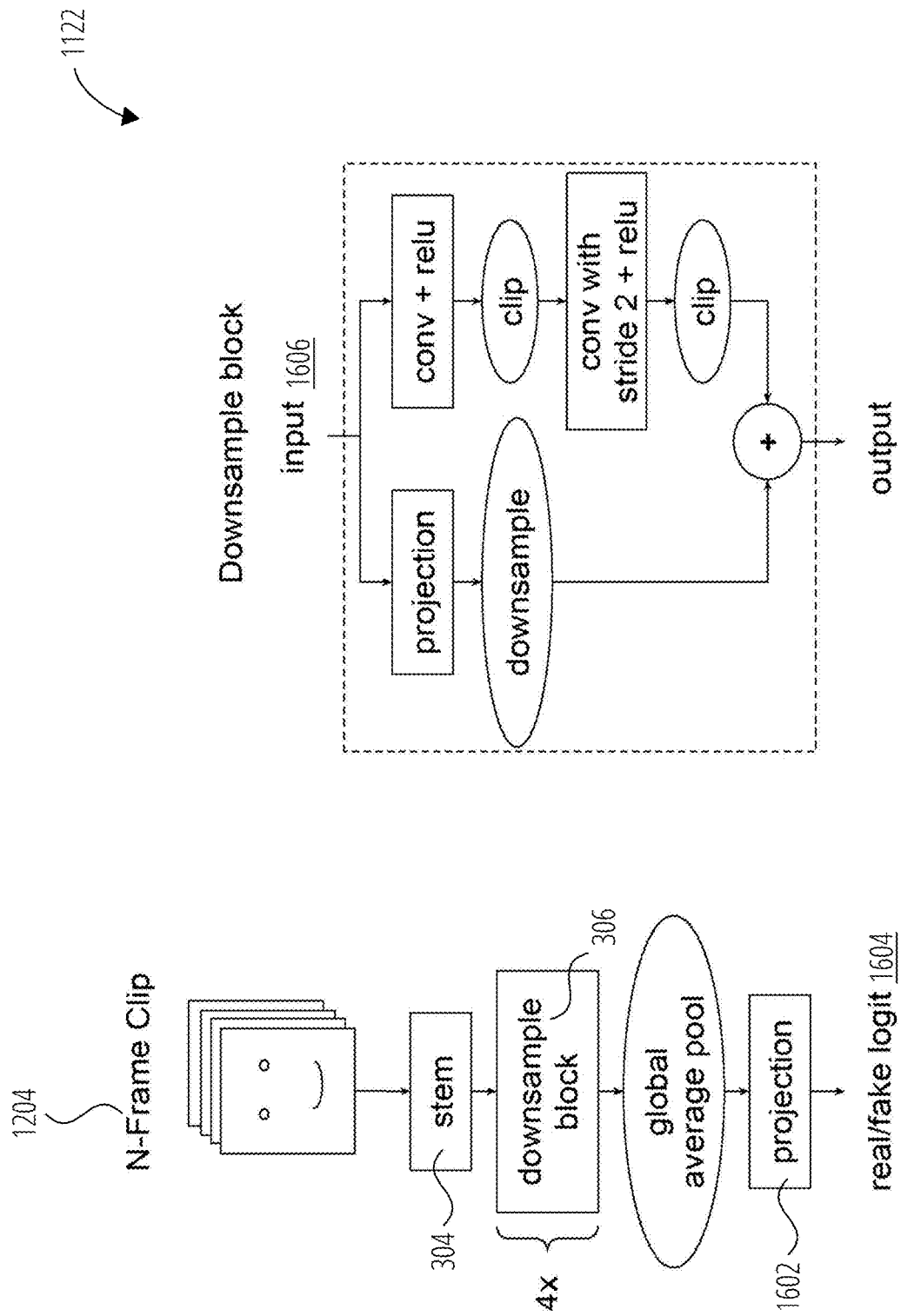
FIG. 16 is a schematic diagram illustrating a discriminator, according to an example embodiment.

FIG. 16 is a schematic diagram illustrating a discriminator 1122 shown in FIG. 11, according to an example embodiment. The discriminator 1122 follows the patch-GAN approach, where a convolutional encoder is used to process and progressively downsample feature maps with global average pooling in the end. The discriminator 1122 is a typical convolutional encoder, consisting of the stem convolution 304 and a set of downsampling convolutional blocks 306. Each of the downsampling convolutional blocks 306 includes several convolutions with the residual connection. The final projection 1602 of the discriminator produces a logit 1604 used in the loss function. Input 1606 to the discriminator 1122 is a batch of consecutive images that are joined together along the channel dimension, thereby allowing for control of pixel values and movements across frames. The discriminator 1122 is trained end-to-end together with the lip synchronization system in a typical GAN regime.

FIG. 17 is a schematic 1700 showing construction of vector database 214, according to some example embodiments of the present disclosure. Face frames 1702 can be provided to vocabulary encoder 202. Vocabulary encoder 202 may include a first neural network trained to generate, based on a face frame, a face vector 1708. Sound frames 1704 can be provided to audio encoder 210. Audio encoder 210 may include a second neural network trained to generate, based on a sound frame, an audio vector 1710.

A record (also referred to as a vector) of vector database 214 may include a face vector and an audio vector corresponding to the face vector. The face vector corresponds to a face frame from face frames 1702 and the audio vector corresponds to a sound frame from sound frames 1704, such that the sound frame is aligned in time with the face frame.

In some embodiments, the face vector may include Euler angles, which are three angles with respect to three space axes corresponding to a pose of user 118 in a corresponding face frame. The audio vector can be a numerical representation (an embedding) of the sound frame, for example a mel-spectrogram. The embeddings may capture meaningful features of the sound frame that can distinguish one sound from another. Thus, vector database 214 includes two tensors stored in memory 108: {'keys_audio': [N, M] and 'keys_video': [N, 3]}, where N—is the number of frames in the source video 104 and M is the size of audio vector.

Referring back to FIG. 2, frame extractor 212 can also process target audio record 110 to generate target audio frames. The target audio frames can be of the same length as a sound frame from sound frames 1704.

Figure 18:
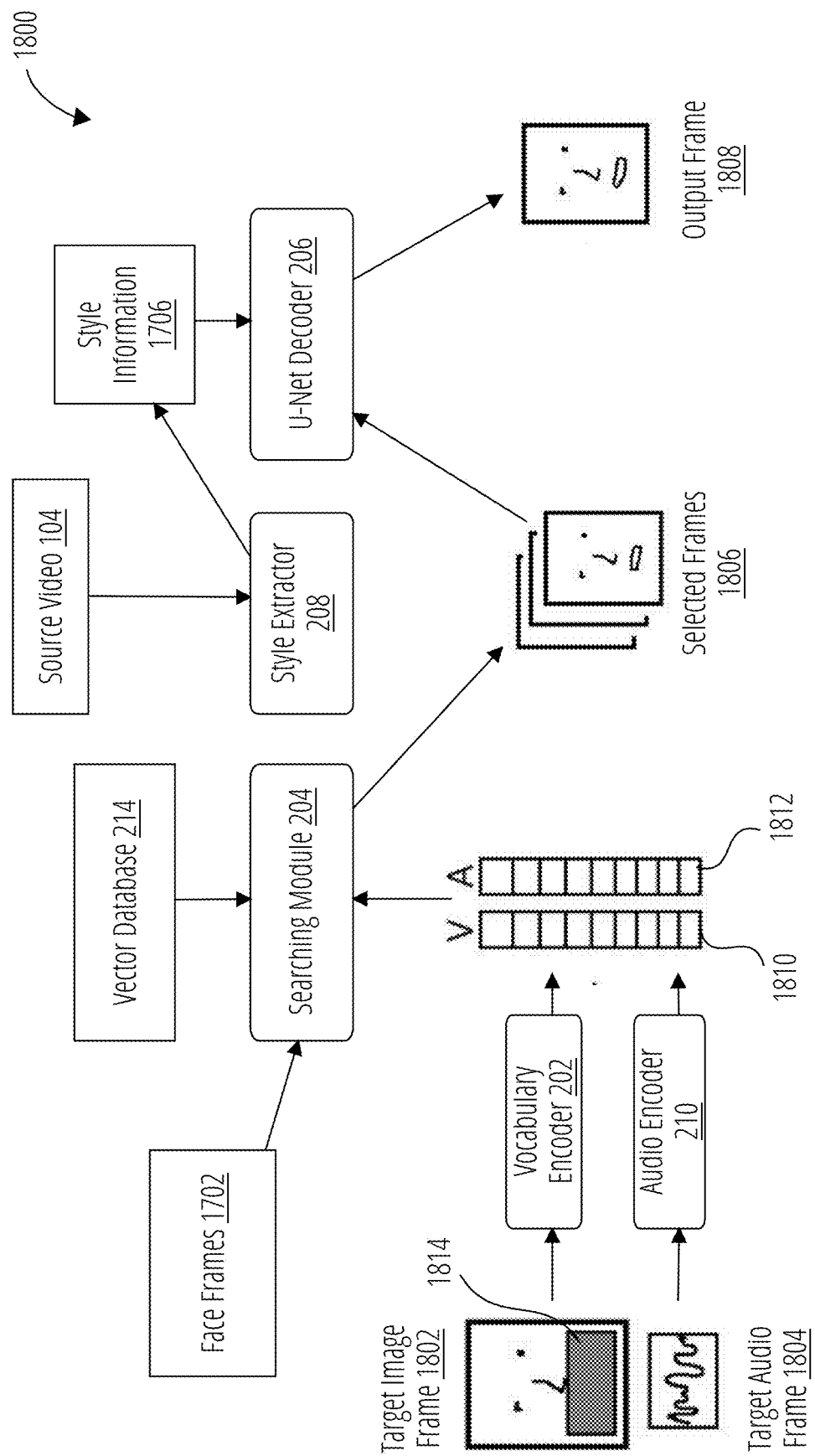
FIG. 18 is a schematic showing a process of generation of an output video, according to some example embodiments of the present disclosure.

FIG. 18 is a schematic 1800 showing process of generation of output video 122, according to some example embodiments of the present disclosure. Lip synchronization system 120 may receive a target image frame 1802 and a target audio frame 1804. Target audio frame 1804 can be sequentially selected from target audio frames of target audio record 110. The target image frame 1802 can be a face frame sequentially selected from face frames 1702. A mouth region 1814 in target image frame 1802 can be obscured with a mask.

Target image frame 1802 can be provided to vocabulary encoder 202 to generate target image vector 1810. Target audio frame 1804 can be provided to audio encoder 210 to generate target audio vector 1812.

Target image vector 1810 and target audio vector 1812 can be provided to searching module 204. Searching module 204 may perform a pre-determined number of queries to vector database 214 to fetch a pre-determined number of vectors corresponding to face frames 1702 that are similar to a face in target image frame 1802. In some embodiments, the first query vector and second query vector can be used. The first query vector can be N-dimensional for target audio vector 1812 extracted from the target audio frame 1804. The second query vector can correspond to target image vector 1810. In certain embodiments, the second query vector may include three-dimensional (3D) Euler angles corresponding to head pose in target image frame 1802. A scaled dot product attention can be used to select a first subset of audio vectors 1710 that are similar to target audio vector 1812. Euclidean distance can be used to select a second subset of face vectors 1708 that are similar to target image vector 1810. After that, K top vectors can be selected from vector database 214 such that the K top vectors correspond to both audio vectors from the first subset and face vectors from the second subset. Searching module 204 may further select, from face frames 1702, K frames 1806 corresponding to K top vectors.

In some embodiments, style extractor 208 may extract style information 1706 from source video 104. Style information 1706 may indicate a presence or an absence of an emotional expression in a face frame from face frames 1702 (for example, whether the mouth of the user is open or not, whether user 118 smiles or not, and so forth). Style information 1706 for the face frame can include a multi-dimensional vector (for example, 48-dimensional vector) of features extracted from the frame by a pre-trained neural network. In addition, style information 1706 for the frame may include an additional multi-dimensional vector of features extracted from the sound frame corresponding to the frame, where the additional vector may indicate, for example, whether user 118 speaks loudly at the moment corresponding to the frame or not.

Target image frame 1802, K top vectors selected from vector database 214, selected frames 1806, and style information 1706 corresponding to selected frames 1806 can be provided to U-net decoder 206. The U-net decoder 206 may include a third neural network trained to generate an output frame 1808. Prior to being provided to U-net decoder 206, target image frame 1802 and selected frames 1806 can be encoded with a convolutional neural network to produce a feature pyramid. The feature pyramid can be then used in convolutional U-net decoder 206.

Referring back to FIG. 2, video encoder 216 may generate, based on output frames 1808 and target audio record, output video 122. In some embodiments, video encoder 216 may include an MP4 encoder. In certain embodiments, faces from output frames 1808 can be inserted into corresponding frames of source video 104 by applying face masks. The face masks can be obtained by a pre-trained face segmentation neural network. The modified source video 104 can be then used instead of the output frames 1808 to generate output video 122.

Figure 19:
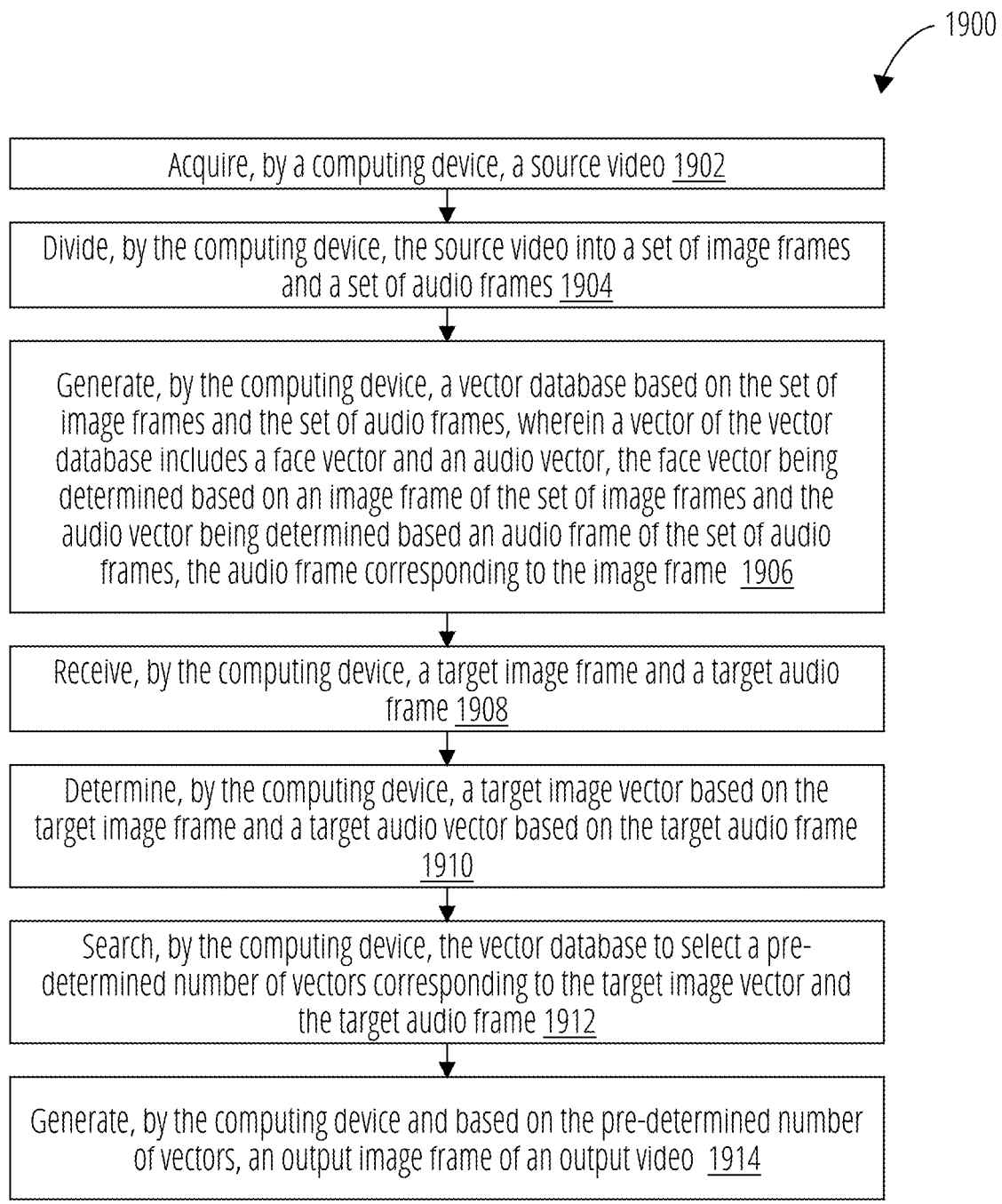
FIG. 19 is a flow chart of an example method for synchronization of lip movement images to an audio voice signal, according to some example embodiments.

FIG. 19 is a flow chart of an example method 1900 for synchronization of lip movement images to an audio voice signal, according to some example embodiments. Method 1900 may be performed by computing device 102 and lip synchronization system 120 described above with references to FIGS. 1-18. Method 1900 may have additional operations not shown herein, but which can be evident to those skilled in the art from the present disclosure. Method 1900 may also have fewer operations than outlined below and shown in FIG. 19. In some embodiments, the operations of method 1900 may be combined, performed in parallel, or performed in a different order.

In block 1902, method 1900 may include acquiring, by a computing device, a source video. For example, the source video can include a video captured by the computing device and featuring a user.

In block 1904, method 1900 may include dividing, by the computing device, the source video in a set of image frames and a set of audio frames.

In block 1906, method 1900 may include generating, by the computing device, a vector database based on the set of image frames and the set of audio frames. A vector of the vector database may include a face vector and an audio vector. The face vector can be determined based on an image frame of the set of image frames. The audio vector can be determined based on an audio frame of the set of audio frames, such that the audio frame corresponds to the image frame.

In block 1908, method 1900 may include receiving, by the computing device, a target image frame and a target audio frame. For example, the target image frame can be selected from the set of image frames generated based on the source video.

In block 1910, method 1900 may include determining, by the computing device, a target image vector based on the target image frame and a target audio vector based on the target audio frame. The face vector and the target image vector can be generated by a vocabulary encoder. The vocabulary may include a first pre-trained neural network. The face vector may include an angle of a rotation of a face in the image frame around an axis. The audio vector and the target audio vector can be generated by a speech encoder. The speech encoder may include a second pre-trained neural network.

In block 1912, method 1900 may include searching, by the computing device, the vector database to select a pre-determined number of vectors corresponding to the target image vector and the target audio frame. The selection of the pre-determined number of vectors may include determining a first metric based on the target image vector and the face vector, determining a second metric based on the target audio vector and the audio vector. The first metric may include a distance between the target image vector and the face vector. The second metric may include a scaled dot product of the target audio vector and the audio vector. The first metric and the second metric can be combined into a third metric. The pre-determined number of vectors for which the third metric is below a predetermined threshold can be then selected to determine vocabulary frames best matching the target image vector and the target audio frame.

In block 1914, method 1900 generates, by the computing device and based on the pre-determined number of vectors, an output image frame of an output video. The output image frame can be generated by a decoder. The decoder may include a third pre-trained neural network. The method may include, prior to generating the output image frame, extracting style information from the set of image frames. The style information may indicate a presence or an absence of an emotional expression in a face in the image frames of the set of image frames. The style information can be provided to the decoder as an additional input for generating the output frame image.

Figure 20:
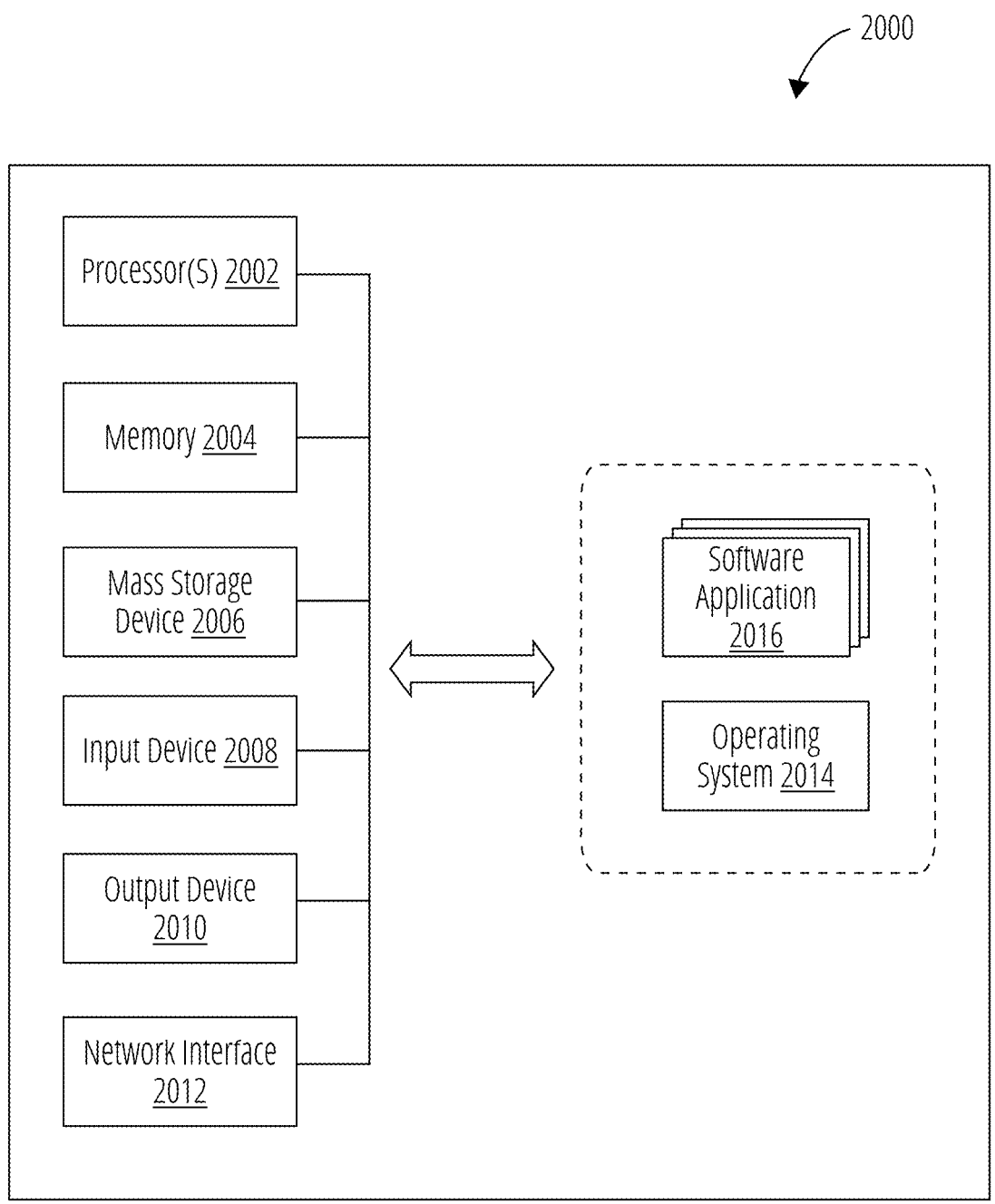
FIG. 20 is a high-level block diagram illustrating an example computer system, within which a set of instructions for causing the machine to perform any one or more of the methodologies discussed herein can be executed.

FIG. 20 is a high-level block diagram illustrating an example computer system 2000, within which a set of instructions for causing the machine to perform any one or more of the methodologies discussed herein can be executed. The computer system 2000 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 2000 is an example of computing device 102 shown in FIG. 1. Notably, FIG. 20 illustrates just one example of the computer system 2000 and, in some embodiments, the computer system 2000 may have fewer elements/modules than shown in FIG. 20 or more elements/modules than shown in FIG. 20.

The computer system 2000 may include one or more processor(s) 2002, a memory 2004, one or more mass storage devices 2006, one or more input devices 2008, one or more output devices 2010, and a network interface 2012. The processor(s) 2002 are, in some examples, configured to implement functionality and/or process instructions for execution within the computer system 2000. For example, the processor(s) 2002 may process instructions stored in the memory 2004 and/or instructions stored on the mass storage devices 2006. Such instructions may include components of an operating system 2014 or software applications 2016. The computer system 2000 may also include one or more additional components not shown in FIG. 20, such as a body, a power supply, a power supply, a global positioning system (GPS) receiver, and so forth.

The memory 2004, according to one example, is configured to store information within the computer system 2000 during operation. The memory 2004, in some example embodiments, may refer to a non-transitory computer-readable storage medium or a computer-readable storage device. In some examples, the memory 2004 is a temporary memory, meaning that a primary purpose of the memory 2004 may not be long-term storage. The memory 2004 may also refer to a volatile memory, meaning that the memory 2004 does not maintain stored contents when the memory 2004 is not receiving power. Examples of volatile memories include random access memories (RAM), dynamic random access memories (DRAM), static random access memories (SRAM), and other forms of volatile memories known in the art. In some examples, the memory 2004 is used to store program instructions for execution by the processor(s) 2002. The memory 2004, in one example, is used by software (e.g., the operating system 2014 or the software applications 2016). Generally, the software applications 2016 refer to software applications suitable for implementing at least some operations of the methods for synchronization of lip movement images to an audio voice signal as described herein.

The mass storage devices 2006 may include one or more transitory or non-transitory computer-readable storage media and/or computer-readable storage devices. In some embodiments, the mass storage devices 2006 may be configured to store greater amounts of information than the memory 2004. The mass storage devices 2006 may further be configured for long-term storage of information. In some examples, the mass storage devices 2006 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 2008, in some examples, may be configured to receive input from a user through tactile, audio, video, or biometric channels. Examples of the input devices 2008 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 2000, or components thereof.

The output devices 2010, in some examples, may be configured to provide output to a user through visual or auditory channels. The output devices 2010 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 2010 may also include a touchscreen, a presence-sensitive display, or other input/output capable displays known in the art.

The network interface 2012 of the computer system 2000, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi Networks®, among others. The network interface 2012 may be a network interface card, such as an Ethernet card, an optical transceiver, a radio frequency transceiver, or any other type of device that can send and receive information.

The operating system 2014 may control one or more functionalities of the computer system 2000 and/or components thereof. For example, the operating system 2014 may interact with the software applications 2016 and may facilitate one or more interactions between the software applications 2016 and components of the computer system 2000. As shown in FIG. 20, the operating system 2014 may interact with or be otherwise coupled to the software applications 2016 and components thereof. In some embodiments, the software applications 2016 may be included in the operating system 2014. In these and other examples, virtual modules, firmware, or software may be part of the software applications 2016.

Thus, systems and methods for synchronization of lip movement images to an audio voice signal have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method comprising:
    acquiring, by a computing device, a source video;
    dividing, by the computing device, the source video into a set of image frames and a set of audio frames;
    generating, by the computing device, a vector database based on the set of image frames and the set of audio frames, wherein a vector of the vector database includes a face vector and an audio vector, the face vector being determined based on an image frame of the set of image frames and the audio vector being determined based an audio frame of the set of audio frames, the audio frame corresponding to the image frame;
    receiving, by the computing device, a target image frame and a target audio frame, the target audio frame being selected from a target audio record, wherein the source video is a first record and the target audio record is a second record, the second record being different from the first record;
determining, by the computing device, a target image vector based on the target image frame and a target audio vector based on the target audio frame;
searching, by the computing device, the vector database to select a pre-determined number of vectors corresponding to the target image vector and the target audio frame; and
generating, by the computing device and based on the pre-determined number of vectors, an output image frame of an output video, the output video being a third record, the third record being different from the first record.

2. The method of claim 1, wherein the acquiring the source video includes capturing, by the computing device, a video featuring a user.

3. The method of claim 1, wherein the face vector and the target image vector are generated by a vocabulary encoder including a pre-trained neural network.

4. The method of claim 1, wherein the face vector includes an angle of a rotation of a face in the image frame around an axis.

5. The method of claim 1, wherein the audio vector and the target audio vector are generated by a speech encoder including a pre-trained neural network.

6. The method of claim 1, wherein the selection of the pre-determined number of vectors includes:
determining a first metric based on the target image vector and the face vector;
determining a second metric based on the target audio vector and the audio vector; and
combining the first metric and the second metric into a third metric; and
determining that the third metric is below a predetermined threshold.

7. The method of claim 6, wherein:
the first metric includes a distance between the target image vector and the face vector; and
the second metric includes a scaled dot product of the target audio vector and the audio vector.

8. The method of claim 1, further comprising, prior to generating the output image frame, extracting style information from the set of image frames, wherein:
the style information indicates a presence or an absence of an emotional expression in a face in the image frames of the set of image frames; and
the output image frame is generated based on the style information.

9. The method of claim 8, wherein the output image frame is generated by a decoder including a pre-trained neural network.

10. The method of claim 8, wherein the target image frame is selected from the set of image frames.

11. A computing device comprising:
a processor; and
a memory storing instructions that, when executed by the processor, configure the computing device to:
acquire, by the computing device, a source video;
divide, by the computing device, the source video into a set of image frames and a set of audio frames;
generate, by the computing device, a vector database based on the set of image frames and the set of audio frames, wherein a vector of the vector database includes a face vector and an audio vector, the face vector being determined based on an image frame of the set of image frames and the audio vector being determined based an audio frame of the set of audio frames, the audio frame corresponding to the image frame;
receive, by the computing device, a target image frame and a target audio frame, the target audio frame being selected from a target audio record, wherein the source video is a first record and the target audio record is a second record, the second record being different from the first record;
determine, by the computing device, a target image vector based on the target image frame and a target audio vector based on the target audio frame;
search, by the computing device, the vector database to select a pre-determined number of vectors corresponding to the target image vector and the target audio frame; and
generate, by the computing device and based on the pre-determined number of vectors, an output image frame of an output video, the output video being a third record, the third record being different from the first record.

12. The computing device of claim 11, wherein the acquiring the source video includes capturing, by the computing device, a video featuring a user.

13. The computing device of claim 11, wherein the face vector and the target image vector are generated by a vocabulary encoder including a pre-trained neural network.

14. The computing device of claim 11, wherein the face vector includes an angle of a rotation of a face in the image frame around an axis.

15. The computing device of claim 11, wherein the audio vector and the target audio vector are generated by a speech encoder including a pre-trained neural network.

16. The computing device of claim 11, wherein the selection of the pre-determined number of vectors includes:
determining a first metric based on the target image vector and the face vector;
determining a second metric based on the target audio vector and the audio vector; and
combining the first metric and the second metric into a third metric; and
determining that the third metric is below a predetermined threshold.

17. The computing device of claim 16, wherein:
the first metric includes a distance between the target image vector and the face vector; and
the second metric includes a scaled dot product of the target audio vector and the audio vector.

18. The computing device of claim 11, wherein the instructions further configure the computing device to, prior to generating the output image frame, extract style information from the set of image frames, wherein:
the style information indicates a presence or an absence of an emotional expression in a face in the image frames of the set of image frames; and
the output image frame is generated based on the style information.

19. The computing device of claim 18, wherein the output image frame is generated by a decoder including a pre-trained neural network.

20. A non-transitory computer-readable storage medium, the computer-readable storage medium including instructions that, when executed by a computing device, cause the computing device to:
acquire a source video;

divide the source video into a set of image frames and a set of audio frames;

generate a vector database based on the set of image frames and the set of audio frames, wherein a vector of the vector database includes a face vector and an audio vector, the face vector being determined based on an image frame of the set of image frames and the audio vector being determined based an audio frame of the set of audio frames, the audio frame corresponding to the image frame;

receive a target image frame and a target audio frame, the target audio frame being selected from a target audio record, wherein the source video is a first record and the target audio record is a second record, the second record being different from the first record;

determine a target image vector based on the target image frame and a target audio vector based on the target audio frame;

search the vector database to select a pre-determined number of vectors corresponding to the target image vector and the target audio frame; and generate, based on the pre-determined number of vectors, an output image frame of an output video, the output video being a third record, the third record being different from the first record.

* * * * *